US012785214B2

(12) United States Patent
Taguchi

(10) Patent No.: US 12,785,214 B2
(45) Date of Patent: Nov. 3, 2026

(54) COMPOSITION FOR ELECTROCHEMICAL DEVICE FUNCTIONAL LAYER, LAMINATE FOR ELECTROCHEMICAL DEVICE, AND ELECTROCHEMICAL DEVICE

(71) Applicant: ZEON CORPORATION, Tokyo (JP)

(72) Inventor: Hiroyuki Taguchi, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 577 days.

(21) Appl. No.: 18/262,199

(22) PCT Filed: Feb. 21, 2022

(86) PCT No.: PCT/JP2022/007033

§ 371 (c)(1),
(2) Date: Jul. 20, 2023

(87) PCT Pub. No.: WO2022/181560

PCT Pub. Date: Sep. 1, 2022

(65) Prior Publication Data

US 2024/0113390 A1 Apr. 4, 2024

(30) Foreign Application Priority Data

Feb. 26, 2021 (JP) ................................ 2021-030794

(51) Int. Cl.

| | |
|---|---|
| ***H01M 50/443*** | (2021.01) |
| ***H01M 10/0525*** | (2010.01) |
| ***H01M 50/417*** | (2021.01) |
| ***H01M 50/449*** | (2021.01) |

(52) U.S. Cl.

CPC ....... *H01M 50/443* (2021.01); *H01M 50/417* (2021.01); *H01M 50/449* (2021.01); *H01M 10/0525* (2013.01)

(58) Field of Classification Search

CPC .......................... H01M 50/449; H01M 50/417

See application file for complete search history.

(56) References Cited

U.S. PATENT DOCUMENTS

| | | | |
|---|---|---|---|
| 2006/0058462 | A1 | 3/2006 | Kim et al. |
| 2010/0010118 | A1 | 1/2010 | Bardman |
| 2019/0305279 | A1 | 10/2019 | Takamatsu |
| 2020/0335827 | A1 | 10/2020 | Sugimoto et al. |
| 2021/0351475 | A1 | 11/2021 | Takizawa et al. |

FOREIGN PATENT DOCUMENTS

| | | | |
|---|---|---|---|
| CN | 101624429 | A | 1/2010 |
| CN | 109075295 | A | 12/2018 |
| JP | 2010270198 | A | 12/2010 |
| JP | 2013145763 | A | 7/2013 |
| JP | 6346986 | B1 | 6/2018 |
| JP | 2018200786 | A | 12/2018 |
| KR | 1020040078927 | A | 9/2004 |
| WO | 2017195564 | A1 | 11/2017 |
| WO | 2018043200 | A1 | 3/2018 |
| WO | 2019131348 | A1 | 7/2019 |
| WO | 2020090395 | A1 | 5/2020 |

OTHER PUBLICATIONS

May 12, 2025, the Extended European Search Report issued by the European Patent Office in the corresponding European Patent Application No. 22759596.4.

Aug. 29, 2023, International Preliminary Report on Patentability issued in the International Patent Application No. PCT/JP2022/007033.

*Primary Examiner* — Barbara L Gilliam
*Assistant Examiner* — Jordan E Berresford
(74) *Attorney, Agent, or Firm* — KENJA IP LAW PC

(57) ABSTRACT

A composition for an electrochemical device functional layer comprising a particulate polymer, a binder, and heat-resistant fine particles. The particulate polymer has a volume average particle diameter of 1.0 μm or more and 10.0 μm or less, and has a structure in which an intermediate portion which has the lowest glass transition temperature is sandwiched by an inner core portion and an outer shell portion each having a glass transition temperature higher than that of the intermediate portion.

8 Claims, No Drawings

COMPOSITION FOR ELECTROCHEMICAL DEVICE FUNCTIONAL LAYER, LAMINATE FOR ELECTROCHEMICAL DEVICE, AND ELECTROCHEMICAL DEVICE

TECHNICAL FIELD

The present disclosure relates to a composition for an electrochemical device functional layer, a laminate for an electrochemical device, and an electrochemical device.

BACKGROUND

Electrochemical devices such as lithium ion secondary batteries and electric double-layer capacitors have characteristics such as compact size, light weight, high energy-density, and the ability to be repeatedly charged and discharged, and are used in a wide range of applications.

Here, for example, a lithium ion secondary battery typically includes battery components such as a positive electrode, a negative electrode, and a separator that separates the positive electrode and the negative electrode, and prevents short-circuiting between the positive electrode and the negative electrode.

In recent years, studies have been conducted for further improvement of electrochemical device components such as a positive electrode, a negative electrode, and a separator in order to further enhance the performance of lithium secondary batteries. In such improvements, attempts have been made to laminate layers (functional layers) that provide desired functions, such as heat resistance and adhesiveness, on the substrate. For example, PTLs 1-4 propose compositions for a functional layer containing particulate polymers having a core-shell structure.

CITATION LIST

Patent Literature

PTL 1: WO 2019/131348 A1
PTL 2: WO 2018/043200 A
PTL 3: JP 2018-200786 A
PTL 4: JP 6346986 B

SUMMARY

Technical Problem

However, there is room for further improvement in conventional electrochemical device components provided with functional layers according to the above conventional technologies in terms of the adhesiveness that can be provided by a separator in a dry state without not being immersed in an electrolyte solution in subsequent processes (hereinafter referred to as "post-storage process adhesiveness") when an electrochemical device component is stored after formation of the functional layer on a substrate such as a separator, in the manufacturing process of electrochemical devices.

Therefore, an object of the present disclosure is to provide a composition for a functional layer which enables formation of a functional layer having excellent post-storage process adhesiveness.

Another object of the present disclosure is to provide a laminate for an electrochemical device provided with a functional layer having excellent post-storage process adhesiveness, and an electrochemical device provided with such a laminate for an electrochemical device.

Solution to Problem

The present inventor has diligently studied ways to address the above challenge. The present inventor has n discovered that it is possible to form a functional layer having excellent post-storage process adhesiveness by using a composition for a functional layer containing a particulate polymer having a volume average particle diameter of 1.0 μm to 10.0 μm and having a structure in which a intermediate portion having the lowest glass transition temperature is sandwiched by an inner core portion and an outer shell portion each having a glass transition temperature higher than that of the intermediate portion.

Specifically, the present disclosure is directed to advantageously solving the problem set forth above, and a composition for an electrochemical device functional layer comprising a particulate polymer, a binder, and heat-resistant fine particles, wherein the particulate polymer has a volume average particle diameter of 1.0 μm or more and 10.0 μm or less, the particulate polymer comprises an inner core portion and an outer shell portion, and an intermediate portion present between the inner core portion and the outer shell portion, a glass transition temperature $Tg^A$ of the inner core portion and a glass transition temperature $Tg^C$ of the outer shell portion are each independently 30° C. or higher, a glass transition temperature $Tg^B$ of the intermediate portion is 10° C. or higher, and the glass transition temperature $Tg^B$ is the lowest among the glass transition temperatures $Tg^A$, $Tg^B$, and $Tg^C$. By blending a particulate polymer having a volume average particle diameter of 1.0 μm to 10.0 μm wherein the glass transition temperature $Tg^B$ is the lowest among $Tg^A$, $Tg^B$, and $Tg^C$ into the composition for a functional layer, a functional layer having excellent post-storage process adhesiveness can be formed.

Note that the "volume average particle diameter" and the "glass transition temperatures $Tg^A$, $Tg^B$, and $Tg^C$" of the particulate polymer can be measured by the methods described in the Examples in the present specification.

Here, in the composition for an electrochemical device functional layer of the present disclosure, the glass transition temperature $Tg^B$ is preferably 90° C. or lower. If the glass transition temperature $Tg^B$ of the intermediate portion of the particulate polymer is 90° C. or lower, a functional layer having more excellent post-storage process adhesiveness can be formed.

Furthermore, in the composition for an electrochemical device functional layer of the present disclosure, the glass transition temperature $Tg^A$ is preferably higher than the glass transition temperature $Tg^B$ by at least 5° C. If the glass transition temperature $Tg^A$ of the inner core portion of the particulate polymer is higher than the glass transition temperature $Tg^B$ of the intermediate portion of the particulate polymer by at least 5° C., a functional layer having more excellent post-storage process adhesiveness can be formed.

In the composition for an electrochemical device functional layer of the present disclosure, it is preferable that the glass transition temperature $Tg^C$ is 60° C. or higher and the following relationship is satisfied: (the glass transition temperature $Tg^B$+5° C.)≤the glass transition temperature $Tg^C$≤ (the glass transition temperature $Tg^B$+200° C.). If the glass transition temperature $Tg^C$ of the outer shell portion of the particulate polymer is within any of the above range, the blocking resistance and dry adhesiveness of the resulting functional layer can be enhanced. Here, "dry adhesiveness"

as used herein means the adhesiveness that can be provided by a functional layer when the manufactured functional layer is used in an adhesion step with an adherend without being stored and the resulting laminate is not immersed in an electrolyte solution or the like.

In addition, in the composition for an electrochemical device functional layer of the present disclosure, a mass ratio of the inner core portion to the intermediate portion is preferably in a range of 95:5 to 30:70. If the mass ratio of the inner core portion to the intermediate portion of the particulate polymer is within such a range, the dry adhesiveness of the resulting functional layer can be enhanced.

In the composition for an electrochemical device functional layer of the present disclosure, a ratio of a total mass of the inner core portion and the intermediate portion to a mass of the outer shell portion is preferably in the range of 99:1 to 50:50. If the ratio of the total mass of the inner core portion and the intermediate portion to the mass of the outer shell portion of the particulate polymer is within any of the above range, the blocking resistance and dry adhesiveness of the resulting functional layer can be enhanced.

Also, the present disclosure is directed to advantageously solving the problem set forth above, and a laminate for an electrochemical device comprises a substrate and an electrochemical device functional layer formed on the substrate, wherein the electrochemical device functional layer is formed using the composition for an electrochemical device functional layer according to any of the above. Thus, the laminate for an electrochemical device provided with a functional layer formed by using the composition for an electrochemical device functional layer has excellent post-storage process adhesiveness.

Furthermore, the present disclosure is directed to advantageously solving problem set forth above, and an electrochemical device of the present disclosure comprises the laminate for an electrochemical device set forth above. The electrochemical device of the present disclosure has excellent electrochemical properties.

Advantageous Effect

According to the present disclosure, it is possible to provide a composition for a functional layer which enables formation of a functional layer having excellent post-storage process adhesiveness.

According to the present disclosure, it is also possible to provide a laminate for an electrochemical device provided with a functional layer that has excellent post-storage process adhesiveness, and an electrochemical device having such a laminate for an electrochemical device.

DETAILED DESCRIPTION

An embodiment of the present disclosure will be described below. Here, a composition for an electrochemical device functional layer of the present disclosure (hereinafter simply referred to as "composition for a functional layer") is used to form a functional layer for an electrochemical device provided in a laminate for an electrochemical device of the present disclosure (hereinafter simply referred to as "functional layer"). The laminate for an electrochemical device of the present disclosure includes a functional layer formed using the composition for an electrochemical device functional layer of the present disclosure. Furthermore, the electrochemical device of the present disclosure is an electrochemical device including at least a laminate for an electrochemical device of the present disclosure.

(Composition for Electrochemical Device Functional Layer)

The composition for an electrochemical device functional layer of the present disclosure contains a certain particulate polymer, a binder, and heat-resistant fine particles, and can optionally further contain other components. The composition for a functional layer of the present disclosure can then be used to form a functional layer with excellent post-storage process adhesiveness.

<Particulate Polymer>

The particulate polymer contained in the composition for a functional layer is a particulate polymer that satisfies the certain structure and has a volume average particle diameter within the certain range, as will be described in detail below. The particulate polymer may be in particle form or in any other shape after the members are bonded to each other via the functional layer formed from the composition for a functional layer.

<<Volume Average Particle Diameter of Particulate Polymer>>

The particulate polymer should have a volume average particle diameter of 1.0 μm or more and 10.0 μm or less, preferably 2.5 μm or more, more preferably 5.0 μm or more, and is preferably 9.0 μm or less, and more preferably 8.0 μm or less. If the volume average particle diameter of the particulate polymer is within any of the above range, the dry adhesiveness of the resulting functional layer can be further enhanced. Although the reason for this is not clear, it is considered that if the volume average particle diameter of the particulate polymer is more than or equal to any of the above lower limits, a portion of the particulate polymer can be made to protrude from the surface of the functional layer, which enhances dry adhesiveness on the surface of the functional layer. In addition, if the volume average particle diameter of the particulate polymer is less than or equal to any of the above upper limits, it is considered that detachment of the particulate polymer from a functional layer can be prevented when forming the functional layer, and the dry adhesive property of the resulting functional layer can be enhanced.

Note that the volume average particle diameter of the particulate polymer can be adjusted, for example, by adjusting the type and amount of a metal hydroxide used in the preparation of the particulate polymer.

<<Structure of Particulate Polymer>>

The particulate polymer includes an inner core portion present in the center of the polymer, an outer shell portion located on the surface of the polymer, and an intermediate portion present between the inner core portion and the outer shell portion. Here, the inner core portion and the intermediate portion may each be a single layer or may be multi-layered. The glass transition temperature of the inner core portion $Tg^A$ and the glass transition temperature $Tg^C$ of the outer shell portion are independently 30° C. or higher, and the glass transition temperature $Tg^B$ of the intermediate portion is 10° C. or higher. Furthermore, the glass transition temperature $Tg^B$ is the lowest among the glass transition temperatures $Tg^A$, $Tg^B$, and $Tg^C$. By blending a particulate polymer in which the glass transition temperature $Tg^B$ is the lowest among $Tg^A$, $Tg^B$, and $Tg^C$ into the composition for a functional layer, a functional layer having excellent post-storage process adhesiveness can be formed. Although the reason for this is not clear, it is assumed that the inner core portion, which has a higher glass transition temperature than the intermediate layer, prevents the particulate polymer from collapsing while the functional layer is being stored, and the outer shell portion, which has a higher glass transition temperature than the intermediate layer, protects the intermediate layer during storage, so that when used in the adhesion step after storage, the intermediate layer with the lowest glass transition temperature can exhibit good adhesive performance.

Here, the outer shell portion may cover the entire surface of the particulate polymer, or may partially cover the surface. From the viewpoint of enhancing the blocking resistance of the functional layer, it is considered that the outer shell portion preferably covers the entire surface of the particulate polymer. In addition, the intermediate portion may entirely or partially cover the surface of the inner core portion. In other words, the outer shell portion and the inner core portion constituting the particulate polymer may have both portions separated by the intermediate portion and portions where the two are in direct contact without having the intermediate portion interposed therebetween. From the viewpoint of further enhancing post-storage process adhesiveness, the intermediate portion preferably covers the entire surface of the inner core portion. In other words, the outer shell portion and the inner core portion is preferably completely separated by the intermediate portion.

<<Glass Transition Temperature of Inner Core Portion>>

The glass transition temperature $Tg^A$ of the inner core portion of the particulate polymer should be 30° C. or higher, preferably 40° C. or higher, more preferably 50° C. or higher, and even more preferably 60° C. or higher. In addition, the glass transition temperature $Tg^A$ of the inner core portion of the particulate polymer is preferably higher than the glass transition temperature $Tg^B$ of the intermediate portion by at least 5° C., and is more preferably higher by at least 10° C. If the glass transition temperature $Tg^A$ of the inner core portion of the particulate polymer is more than or equal to any of the above lower limits, the collapse of the particulate polymer can be favorably suppressed when a substrate having a functional layer is rolled up for storage, which can further improve the post-storage process adhesiveness and the electrolyte solution injectability of an electrochemical device can be further improved. In addition, the collapse of the particulate polymer is favorably suppressed during storage. As a result, the number of adhesion points to the adherend member such as an electrode is sufficiently secured, and the cushioning property against swelling or contraction of an electrode is sufficiently secured, which enhances the cycle characteristics of the resulting electrochemical device. Note that the upper limit of the glass transition temperature $Tg^A$ of the inner core portion of the particulate polymer is not particularly limited and can be 300° C. or lower, for example.

Here, as mentioned above, the inner core portion may be a single layer or may be multilayered. Specifically, when seed polymerization is employed as the polymerization method in preparing the particulate polymer, the inner core portion may be composed of two layers, namely, a layer made of the polymer that forms the seed particle and a layer made of the polymer that coats so as to surround the seed particle. When the inner core portion contains the seed particle, at least one of the polymer forming the seed particle and the polymer that coats the seed particle so as to surround the seed particle should satisfy the above glass transition temperature conditions, and it is more preferable that both of them satisfy the conditions. If it is not clear whether the polymer present at the core of the particulate polymer is derived from a seed particle, the glass transition temperatures of the polymers constituting the two layers of from the center are measured, the obtained glass transition temperatures are weighted by the mass of each layer, the average value is calculated, and the resultant average temperature is used as the glass transition temperature of the inner core portion $Tg^A$.

<<Composition of Inner Core Portion>>

The polymer constituting the inner core portion (hereinafter also referred to as "polymer A") may be made of any monomer unit without any particular limitation as long as the above-described conditions of the glass transition temperature $Tg^A$ are satisfied. The phrase "the polymer contains a monomer unit" herein means that "a structural unit derived from that monomer is contained in the polymer obtained using that monomer." The content proportion of the monomer unit in a polymer can be measured by a nuclear magnetic resonance (NMR) method such as $^1$H-NMR and $^{13}$C-NMR.

The polymer A may include, for example, aromatic vinyl monomer units, (meth)acrylic acid ester monomer units, and cross-linkable monomer units. As used herein, "(meth) acrylic" means acrylic or methacrylic.

[Aromatic Vinyl Monomer Unit]

The aromatic vinyl monomer that can form the aromatic vinyl monomer unit is not limited. Examples include, but are not limited to, styrene, α-methylstyrene, styrenesulfonic acid, butoxystyrene, and vinylnaphthalene, among which styrene is preferable.

Note that one of these aromatic vinyl monomers can be used alone or in combination of two or more thereof in any proportion.

The percentage content of aromatic vinyl monomer units in the polymer A is not particularly limited. For example, the percentage content of aromatic vinyl monomer units may be 40 mass % or more, may be 50 mass % or more, may be 95 mass % or less, or may be 90 mass % or less, when all repeating units included in the polymer A are taken to be 100 mass %. If the percentage content of aromatic vinyl monomer units in the polymer A is within any of the above range, the collapse of the particulate polymer during storage can be more favorably suppressed by moderately increasing the strength of the inner core portion, and as a result, the post-storage process adhesiveness can be further enhanced.

[(Meth)Acrylic Acid Ester Monomer Unit]

Examples of (meth)acrylic acid ester monomers that can be used to form the (meth)acrylic acid ester monomer unit include acrylates, such as methyl acrylate, ethyl acrylate, n-propyl acrylate, isopropyl acrylate, n-butyl acrylate, isobutyl acrylate, t-butyl acrylate, n-amyl acrylate, isoamyl acrylate, n-hexyl acrylate, 2-ethylhexyl acrylate, 2-methoxyethyl acrylate, 2-ethoxyethyl acrylate, hexyl acrylate, nonyl acrylate, lauryl acrylate, stearyl acrylate, and benzyl acrylate; and methacrylates, such as methyl methacrylate, ethyl methacrylate, propyl methacrylate, isopropyl methacrylate, n-butyl methacrylate, isobutyl methacrylate, t-butyl methacrylate, n-amyl methacrylate, isoamyl methacrylate, n-hexyl methacrylate, 2-ethylhexyl methacrylate, octyl methacrylate, isodecyl methacrylate, lauryl methacrylate, tridecyl methacrylate, stearyl methacrylate, and benzyl methacrylate. Of these, 2-ethylhexyl acrylate is preferable. One of these monomers may be used alone or two or more of these may be used in combination in any ratio.

The percentage content of (meth)acrylic acid ester monomer units in the polymer A is not particularly limited, and for example, the percentage content is preferably 5 mass % or more, more preferably 10 mass % or more, and is preferably 50 mass % or less, more preferably 40 mass % or less, when the total repeating units contained in the polymer A are taken to be 100 mass %. If the percentage content of (meth)acrylic acid ester monomer units in the polymer A is within any of the above range, the dry adhesiveness and blocking resistance of the functional layer can be further enhanced.

[Cross-Linkable Monomer Unit]

The polymer (A) may further contain a cross-linkable monomer unit. Examples of cross-linkable monomers that may form a cross-linkable monomer unit include multi-functional monomers having two or more polymerizable reactive groups in the molecule. Examples of such polyfunctional monomers include divinyl compounds such as allyl methacrylate and divinylbenzene; di(meth)acrylic acid ester compounds such as diethylene glycol dimethacrylate, ethylene glycol dimethacrylate, diethylene glycol diacrylate, and 1,3-butylene glycol diacrylate; and tri(meth)acrylic acid ester compounds such as trimethylolpropane trimethacrylate and trimethylolpropane triacrylate. Of these, ethylene glycol dimethacrylate is preferred. One of these cross-linkable monomers may be used alone or two or more of these may be used in combination in any ratio.

The percentage content of cross-linkable monomer units in the polymer A is not particularly limited, and for example, the percentage content is preferably 0.05 mass % or more, more preferably 10% or more, and is preferably 90 mass % or less, more preferably 85 mass % or less, when the total repeating units contained in the polymer A are taken to be 100 mass %. If the percentage content of cross-linkable monomer units in the polymer A is more than or equal to any of the above lower limits, the collapse of the particulate polymer during storage can be more favorably suppressed by increasing the strength of the inner core portion, and as a result, the post-storage process adhesiveness can be further enhanced. If the percentage content of cross-linkable monomer units in the polymer A is less than or equal to any of the above upper limits, the ease of production of the particulate polymer can be improved.

In addition to the above, the polymer A may contain other monomer units. Examples of such monomer units include, without limitation, nitrile group-containing monomer units as detailed in the <Binder> section, and epoxy group-containing unsaturated monomer units as detailed in the <Polymer B> section.

<<Glass Transition Temperature of Intermediate Portion>>

The glass transition temperature $Tg^B$ of the intermediate portion of the particulate polymer should be 10° C. or higher, preferably 20° C. or higher, more preferably 30° C. or higher, more preferably 40° C. or higher, and is preferably 90° C. or lower, and more preferably 70° C. or lower. If the glass transition temperature $Tg^B$ of the intermediate portion of the particulate polymer is more than or equal to any of the above lower limits, blocking can be suppressed when the substrate having the functional layer is rolled up for storage. In addition, if the glass transition temperature $Tg^B$ of the intermediate portion of the particulate polymer is less than or equal to any of the above upper limits, good adhesiveness can be provided upon bonding with an adherend such as an electrode by pressing, and dry adhesiveness of a functional layer can be enhanced.

Here, as mentioned above, the intermediate portion may be a single layer or may be multilayered. If there are multiple intermediate layers, the average temperature calculated by weighting the glass transition temperatures of the multiple layers constituting the intermediate layer by the mass of each layer is used as the glass transition temperature $Tg^B$ of the intermediate layer.

<<Composition of Intermediate Portion>>

The polymer forming the intermediate portion may be made of any monomer unit without any particular limitation as long as the above-described conditions of the glass transition temperature $Tg^B$ are satisfied. The polymer forming the intermediate layer is hereinafter also referred to as polymer B (when the intermediate portion is composed of n layers, the polymer forming each layer is referred to as polymer $B^1$ to polymer $B^n$). The composition of the polymers $B^1$ to $B^n$ may be the same or different from each other.

The polymer B ($B^1$ to $B^n$; hereinafter omitted) can contain, for example, aromatic vinyl monomer units and (meth) acrylic acid ester monomer units similar to those described as units that may be contained in the polymer A.

The percentage content of aromatic vinyl monomer units in the polymer B is not particularly limited, and for example, the percentage content is preferably 30 mass % or more, more preferably 40 mass % or more, and is preferably 90 mass % or less, more preferably 80 mass % or less, when the total repeating units contained in the polymer B are taken to be 100 mass %.

The percentage content of (meth)acrylic acid ester monomer units in the polymer B is not particularly limited, and for example, the percentage content is preferably 10 mass % or more, more preferably 20% or more, and is preferably 50 mass % or less, more preferably 40 mass % or less, when the total repeating units contained in the polymer B are taken to be 100 mass %.

In addition, the polymer B may contain epoxy group-containing unsaturated monomer units.

[Epoxy Group-Containing Unsaturated Monomer Unit]

Examples of the epoxy group-containing unsaturated monomers that may constitute epoxy group-containing unsaturated monomer units include unsaturated glycidyl ethers such as vinyl glycidyl ether, allyl glycidyl ether, butenyl glycidyl ether, o-allylphenyl glycidyl ether, and glycidyl (2-butenyl) ether; monoepoxides of dienes or polyenes, such as butadiene monoxide, chloroprene monoxide, 4,5-epoxy-2-pentene, 3,4-epoxy-1-vinylcyclohexene, and 1,2-epoxy-5,9-cyclododecadiene; alkenyl epoxides, such as 3,4-epoxy-1-butene, 1,2-epoxy-5-hexene, 1,2-epoxy-9-decene; and glycidyl esters of unsaturated carboxylic acids, such as glycidyl acrylate, glycidyl methacrylate, glycidyl crotonate, glycidyl-4-heptenoate, glycidyl sorbate, glycidyl linoleate, glycidyl-4-methyl-3-pentenoate, glycidyl esters of 3-cyclohexenecarboxylic acid, and glycidyl esters of 4-methyl-3-cyclohexenecarboxylic acid. Of these, glycidyl methacrylate is preferably used. One of these epoxy group-containing unsaturated monomer may be used alone or two or more of these may be used in combination in any ratio.

The percentage content of the epoxy group-containing unsaturated monomer unit in the polymer B is not particularly limited, and, for example, the percentage content is preferably 1 mass % or more, more preferably 5 mass % or more, and is preferably 20% or less, more preferably 15 mass % or less, when the total repeating units contained in the polymer B is taken to be 100 mass %. If the percentage content of epoxy group-containing unsaturated monomer units contained in the polymer B is within any of such ranges, the process adhesiveness of the resulting functional layer after storage can be further enhanced.

Note that the polymer B may contain other monomer units in addition to the above. Such monomer units include, without limitation, nitrile group-containing monomer units as detailed in the <Binder> section.

<<Glass Transition Temperature of Outer Shell Portion>>

The glass transition temperature $Tg^C$ of the outer shell portion of the particulate polymer should be 30° C. or higher, preferably 60° C. or higher, more preferably 70° C. or higher, even more preferably 80° C. or higher, and is preferably 210° C. or lower, more preferably 150° C. or lower, even more preferably at 120° C. or lower, particularly preferably 110° C. or lower. In addition, the glass transition temperature $Tg^C$ of the outer shell portion of the particulate polymer preferably satisfies the following interrelationship with the glass transition temperature $Tg^B$ of the intermediate portion: (the glass transition temperature $Tg^B$+5° C.)≤the glass transition temperature $Tg^C$≤(the glass transition temperature $Tg^B$+200° C.), preferably satisfies (the glass transition temperature $Tg^B$+20° C.)≤the glass transition temperature $Tg^C$≤(the glass transition temperature $Tg^B$+100° C.). If the glass transition temperature $Tg^C$ of the outer shell portion of the particulate polymer is more than or equal to any of the above lower limits, the occurrence of blocking during storage can be favorably suppressed. In addition, if the glass transition temperature $Tg^C$ of the outer shell portion of the particulate polymer is less than or equal to any of the above upper limits, the dry adhesiveness of the functional layer can be further enhanced.

<<Composition of Outer Shell Portion>>

The polymer constituting the outer shell portion (hereinafter also referred to as polymer C) may be made of any monomer unit without any particular limitation as long as the above-described conditions of the glass transition temperature $Tg^C$ are satisfied. The polymer C may contain, for example, (meth)acrylic acid ester monomer units and cross-linkable monomers similar to those described as units that may be contained in the polymer A.

The percentage content of (meth)acrylic acid ester monomer units in the polymer C is not particularly limited, and for example, the percentage content is preferably 50% or more, more preferably 60 mass % or more, and is preferably 99.9 mass % or less, more preferably 98 mass % or less, when the total repeating units contained in the polymer C are taken to be 100 mass %. If the percentage content of (meth)acrylic acid ester monomer units in the polymer C is within any of the above range, the collapse of the particulate polymer during storage can be more favorably suppressed by moderately increasing the strength of the outer shell portion, and as a result the post-storage process adhesiveness can be further enhanced.

The percentage content of the cross-linkable monomer unit in the polymer C is not particularly limited, and for example, the percentage content is preferably 0.05 mass % or more, more preferably 1 mass % or more, and is preferably 15 mass % or less, more preferably 10 mass % or less, when the total repeating units contained in the polymer C are taken to be 100 mass %. If the percentage content of cross-linkable monomer units in the polymer C is within any of the above range, the collapse of the particulate polymer during storage can be more favorably suppressed by moderately increasing the strength of the outer shell portion, and as a result, the post-storage process adhesiveness can be further enhanced.

In addition to the above, the polymer C may contain other monomer units. Such monomer units include, without limitation, nitrile group-containing monomer units as detailed in the <Binder> section, and epoxy group-containing unsaturated monomer units as detailed in the <Polymer B> section.

<<Mass Ratio of Inner Core Portion to Intermediate Portion>>

The mass ratio of the inner core portion to the intermediate portion constituting the particulate polymer is in the range of preferably 95:5 to 30:70, more preferably 90:10 to 40:60, and even more preferably 80:20 to 50:50. When the mass ratio of the inner core portion is more than or equal to any of the above lower limits, the collapse of the particulate polymer during storage can be more favorably suppressed, and as a result, the post-storage process adhesiveness can be further enhanced. In addition, the collapse of the particulate polymer is even favorably suppressed during storage, which enhances the cycle characteristics of the resulting electrochemical device. In addition, if the mass ratio of the intermediate portion is more than or equal to any of the above lower limits, the post-storage process adhesiveness and dry adhesiveness can be further enhanced.

<<Ratio of Mass of (Inner Core Portion+Intermediate Portion) to Mass of Outer Shell Portion Mass>>

It is preferable that the ratio of the total mass of the inner core portion and the intermediate portion to the mass of the outer shell portion constituting the particulate polymer is preferably in the range of 99:1 to 50:50, more preferably in the range of 95:5 to 60:40, and even more preferably in the range of 90:10 to 70:30. If the total mass of the inner core portion and the intermediate portion is more than or equal to any of the above lower limits, dry adhesiveness and post-storage process adhesiveness can be further enhanced. Furthermore, if the total mass of the inner core portion and the intermediate portion is greater than or equal to any of the above lower limits, the outer shell portion is restrained from becoming excessively thick, which enhances adhesiveness (dry adhesiveness and post-storage process adhesiveness) by the functional layer and maintains the distance between the functional layer and the adherend such as an electrode in an electrochemical device, thereby ensuring an entry path for the electrolyte solution. As a result, injectability into an electrochemical device can be improved. In addition, if the total mass of the inner core portion and the intermediate portion is less than or equal to any of the above upper limits, blocking during storage can be more favorably suppressed.

[Preparation of Particulate Polymer]

The particulate polymer can be produced through polymerization of a monomer composition that contains the monomers set forth above carried out in an aqueous solvent, such as water. Here, the proportion of each monomer in the monomer composition is normally the same as the proportion of the corresponding monomer unit in the particulate polymer.

No specific limitations are placed on the mode of polymerization and any method such as suspension polymerization, emulsion polymerization aggregation, and grinding can be used. Of these, suspension polymerization and emulsion polymerization aggregation are preferred, and suspension polymerization is more preferred. Also, any polymerization reaction can be used, such as radical polymerization or living radical polymerization.

Furthermore, other blending agents such as chain transfer agents, polymerization regulators, polymerization reaction retardants, reactive fluidizers, fillers, flame retardants, antiaging agents, and colorants can be blended in any quantity in the monomer composition used to prepare the particulate polymer.

Here, as an example, a method for preparing a particulate polymer by suspension polymerization will be described.

[Preparation of Particulate Polymer by Suspension Polymerization]

(1) Preparation of Monomer Composition

First, a monomer composition (A) corresponding to the composition of the polymer A for the inner core portion, a monomer composition (C) corresponding to the composition of the polymer B for the intermediate portion, and a monomer composition (B) corresponding to the composition of the polymer C for the outer shell portion are prepared. In this step, various monomers are blended according to the compositions of the polymer A, the polymer B, and the polymer C. In addition, other blending agents to be added are mixed as needed.

(2) Formation of Droplets

Next, after the monomer composition (A) is dispersed in water and a polymerization initiator is added, droplets of the monomer composition (A) are formed. Here, the method of forming droplets is not particularly limited. For example, droplets can be formed by shear-agitating water containing the monomer composition (A) using a dispersing machine such as an emulsion-dispersion machine.

Examples of the polymerization initiator used in this step include oil-soluble polymerization initiators such as t-butylperoxy-2-ethylhexanoate and azobisisobutyronitrile. Note that the polymerization initiator may be added after the monomer composition (A) is dispersed in water and before the droplets are formed, or may be added to the monomer composition (A) before dispersed in water.

From the viewpoint of stabilizing the resulting droplets of the monomer composition (A) in water, it is preferable to add a dispersion stabilizer to the water and droplets of the monomer composition (A) are formed. In this case, metal hydroxides such as magnesium hydroxide and sodium dodecylbenzenesulfonate, for example, can be used as the dispersion stabilizer.

(3) Polymerization

After droplets of the monomer composition (A) are formed, the water containing the resulting droplets is heated to initiate polymerization. When the polymerization conversion rate becomes sufficiently high, the monomer composition (B) is added and polymerization is continued. Furthermore, when the polymerization conversion rate becomes sufficiently high, the monomer composition (C) is added and polymerization is continued to form a particulate polymer having a certain structure in water. In this case, the reaction temperature for polymerization is preferably 50° C. or higher and 95° C. or lower. In addition, the reaction time for polymerization is preferably 1 hour or longer and 10 hours or shorter, preferably 8 hours or shorter, and more preferably 6 hours or shorter.

(4) Washing, Filtration, Dehydrating, and Drying Steps

After the polymerization is completed, the water containing the particulate polymer is washed, filtered, and dried according to the regular method to obtain a particulate polymer having a certain structure.

Note that the amount ratio among the monomer composition (A), the monomer composition (B), and the monomer composition (C) can be set appropriately to satisfy the suitable ranges of "mass ratio of the inner core portion to the intermediate portion" and "the mass of (inner core portion+intermediate portion) to the mass of the outer shell portion" as described above.

<Binder>

The binder causes heat-resistant fine particles to bind together in a functional layer. Examples of the binder include known polymers used as binders, such as conjugated diene polymers, acrylic polymers, polyvinylidene fluoride (PVDF), and polyvinyl alcohol (PVOH). One binder may be used alone, or two or more binders may be used in combination. As the binder, a polymer that is water-insoluble and can be dispersed in a dispersing medium such as water, such as conjugated diene polymers, acrylic polymers, and polyvinylidene fluoride (PVDF), are preferred, conjugated diene polymers and acrylic polymers are more preferred, and acrylic polymers are further preferred. When a functional layer formed from the composition for a functional layer is arranged so as to be adjacent to a positive electrode, it is preferable to use a binder other than conjugated diene polymers as the binder.

When a polymer is referred to as "water-insoluble" in the present disclosure, this means that when 0.5 g of the polymer is dissolved in 100 g of water at a temperature of 25° C., insoluble content is 90 mass % or more.

Here, a conjugated diene polymer refers to a polymer that includes a conjugated diene monomer unit. Specific examples of the conjugated diene polymer include, but are not specifically limited to, a copolymer including an aromatic vinyl monomer unit and an aliphatic conjugated diene monomer unit such as a styrene-butadiene copolymer (SBR); butadiene rubber (BR); acrylic rubber (NBR) (copolymer including an acrylonitrile unit and a butadiene unit); and hydrogenated products thereof.

In addition, an acrylic polymer refers to a polymer that includes a (meth)acrylic acid ester monomer unit.

One of these binders may be used alone or two or more of these may be used in combination in any ratio.

The acrylic polymer that can be preferably used as a binder is not particularly limited, and examples include, for example, the cross-linkable monomer units, epoxy group-containing unsaturated monomer units, and (meth)acrylic acid ester monomer units described above, as well as nitrile group-containing monomer units and acidic group-containing monomer units described below.

As monomers that can be used to form cross-linkable monomer units and (meth)acrylic acid ester monomer units, those described above in the section on the polymer A can be used. In addition, as monomers that can be used to form epoxy group-containing unsaturated monomer units, those described above in the section on the polymer B can be used.

Examples of nitrile group-containing monomers that can be used to form the nitrile group-containing monomer unit include α,β-ethylenically unsaturated nitrile monomers. Specifically, an α,β-ethylenically unsaturated nitrile monomer is not particularly limited as long as it is an α,β-ethylenically unsaturated compound having a nitrile group, and examples include, for example, acrylonitrile; α-halogeno acrylonitrile such as α-chloro acrylonitrile and α-bromo acrylonitrile; α-alkyl acrylonitrile such as methacrylonitrile and α-ethylacrylonitrile, or the like. These nitrile group-containing monomers may be used alone or two or more of these may be used in combination in any ratio.

Examples of acid group-containing monomers that can be used to form the acidic group-containing monomer unit include carboxyl group-containing monomers, sulfonate group-containing monomers, phosphate group-containing monomers, and hydroxy group-containing monomers.

Examples of carboxyl group-containing monomers include monocarboxylic acids and dicarboxylic acids. Examples of monocarboxylic acids include acrylic acid, methacrylic acid, and crotonic acid. Examples of dicarboxylic acids include maleic acid, fumaric acid, and itaconic acid.

Examples of the sulfonate group-containing monomers include vinyl sulfonic acid, methylvinyl sulfonic acid, (meth)allyl sulfonic acid, (meth)acrylic acid-2-ethyl sulfonate, 2-acrylamide-2-methyl propane sulfonic acid, and 3-allyloxy-2-hydroxypropane sulfonic acid.

In the present specification, "(meth)allyl" is used to indicate "allyl" and/or "methallyl", and "(meth)acryl" is used to indicate "acryl" and/or "methacryl".

Examples of the phosphate group-containing monomers include 2-(meth)acryloyloxyethyl phosphate, methyl-2-(meth)acryloyloxyethyl phosphate, and ethyl-(meth)acryloyloxyethyl phosphate.

Note that the term "(meta)acryloyl" as used therein refers to acryloyl and/or methacryloyl.

Examples of hydroxy group-containing monomers include 2-hydroxyethyl acrylate, 2-hydroxypropyl acrylate, 2-hydroxyethyl methacrylate, and 2-hydroxypropyl methacrylate.

These acid group-containing monomers may be used alone or two or more of these may be used in combination in any ratio.

Note that the proportion of (meth)acrylic acid ester monomer units in acrylic polymers is preferably 50 mass % or more, more preferably 55 mass % or more, and even more preferably 58 mass % or more, and is preferably 98 mass % or less, more preferably 97 mass % or less, and even more preferably 96 mass % or less. By setting the proportion of (meth)acrylic acid ester monomer units to be more than or equal to any of the above lower limits of the above ranges, the adhesive properties of the functional layer (dry adhesiveness and post-storage process adhesiveness) can be increased. By setting the proportion to be less than or equal to any of the upper limits, the electrochemical properties of an electrochemical device provided with a functional layer can be further enhanced.

In addition, the total percentage content of cross-linkable monomer units and epoxy group-containing unsaturated monomer units in the acrylic polymer is preferably 0.1 mass % or more and more preferably 1.0 mass % or more, and is preferably 3.0 mass % or less and more preferably 2.5 mass % or less. By setting the percentage of cross-linkable monomer units to be more than or equal to any of the above limits, the electrochemical properties of an electrochemical device provided with a functional layer can be further enhanced. By setting the percentage of cross-linkable monomer units to be less than or equal to any of the above upper limits, the adhesive properties of the functional layer (dry adhesiveness and post-storage process adhesiveness) can be increased.

In addition, the percentage of the nitrile group-containing monomer units in the acrylic polymer is preferably 0.1 mass % or more, more preferably 0.3 mass % or more, even more preferably 0.5 mass % or more, and is preferably 20 mass % or less, more preferably 10 mass % or less, and even more preferably 5 mass % or less. By setting the percentage of nitrile group-containing monomer units within any of the above range, the adhesive properties of the functional layer (dry adhesiveness and post-storage process adhesiveness) can be increased.

In addition, the percentage of the acid group-containing monomer unit in the acrylic polymer is preferably 0.1 mass % or more, more preferably 0.3 mass % or more, even more preferably 0.5 mass % or more, and is preferably 20 mass % or less, more preferably 10 mass % or less, and even more preferably 5 mass % or less. By setting the proportion of acid group-containing monomer units to be more than or equal to any of the above lower limits, the dispersibility of the binder in the composition for a functional layer and in the functional layer can be enhanced, and the electrochemical properties of an electrochemical device provided with a functional layer can be sufficiently enhanced. By setting the proportion of acid group-containing monomer units to be less than or equal to any of the above upper limits, the residual water content in the functional layer can be reduced and the electrochemical properties of an electrochemical device can be sufficiently enhanced.

Note that the acrylic polymer may also include other monomer units.

<<Glass Transition Temperature of Binder>>

The glass transition temperature (Tg) of the binder is preferably −100° C. or higher, more preferably −90° C. or higher, even more preferably −80° C. or higher, and is preferably less than 30° C., more preferably 20° C. or lower, and even more preferably 15° C. or lower. If the glass transition temperature of the binder is more than or equal to any of the above lower limits, the adhesiveness (dry adhesiveness and post-storage process adhesiveness) and the strength of the binder can be enhanced. On the other hand, if the glass transition temperature of the binder is less than or equal to any of the above upper limits, the flexibility of a functional layer can be enhanced.

<<Volume Average Particle Diameter of Binder>>

The volume average particle diameter of the binder is not particularly limited, and is less than 1.0 μm, for example, preferably 0.8 μm or less, 0.5 μm or less, more preferably 0.3 μm or less, and is preferably 0.05 μm or more, more preferably 0.1 μm or more. If the volume average particle diameter of the binder satisfies any of the above upper limits, the adhesiveness (dry adhesiveness and post-storage process adhesiveness) and the strength of the binder can be enhanced. If the volume average particle diameter of the binder is more than or equal to any of the above lower limits, the output characteristics of a resulting electrochemical device can be enhanced. Note that the volume average particle diameter of the binder can be measured by the method described in the examples section.

[Content of Binder]

The content of the binder is preferably 0.1 parts by mass or more, more preferably 0.2 parts by mass or more, and even more preferably 0.5 parts by mass or more, and is preferably 20 parts by mass or less, more preferably 15 parts by mass or less, and even more preferably 10 parts by mass or less, per 100 parts by mass of heat-resistant fine particles. If the content of the binder is more than or equal to any of the above lower limits, it is possible to sufficiently prevent detachment of the particulate polymer from a functional layer and to sufficiently enhance the adhesiveness of the functional layer. On the other hand, if the content of the binder is less than or equal to any of the above upper limits, reduction in the ionic conductivity of a functional layer can be suppressed and reduction in the output characteristics of an electrochemical device can be suppressed.

Note that the binder can be prepared without any particular limitation, for example, by polymerizing a monomer composition containing the monomers mentioned above in an aqueous solvent such as water. Here, the proportion of each monomer in the monomer composition is normally the same as the proportion of the corresponding monomer unit in the binder.

The polymerization method and polymerization reaction are not particularly limited, and the polymerization method and polymerization reaction mentioned above in the polymerization method for the particulate polymer can be used, for example.

The shape of the binder may be particulate or non-particulate, but from the viewpoint of preventing detachment of components contained in a functional layer, the shape of the binder is preferably particulate.

<<Heat-Resistant Fine Particles>>

Here, the heat-resistant fine particles included in a functional layer are not limited, and examples include fine particles made of inorganic materials (i.e., inorganic fine particles) and fine particles made of organic materials (i.e., organic fine particles), which can be stably exist and are electrochemically stable in the operating environment of an electrochemical device.

As heat-resistant fine particles, inorganic or organic fine particles may be used alone or inorganic and organic fine particles are used in combination.

[Inorganic Fine Particles]

Examples of the inorganic fine particles include particles of inorganic oxides such as aluminum oxide (alumina, $Al_2O_3$), hydrated aluminum oxide (boehmite (AlOOH)), gibbsite ($Al(OH)_3$), silicon oxide, magnesium oxide (magnesia), magnesium hydroxide, calcium oxide, titanium oxide (titania), barium titanate ($BaTiO_3$), ZrO, and alumina-silica composite oxide; particles of nitrides such as aluminum nitride and boron nitride; particles of covalent crystals such as silicon and diamond; particles of sparingly soluble ionic crystals such as barium sulfate, calcium fluoride, and barium fluoride; and fine particles of clays such as talc and montmorillonite. These particles may be subjected to element substitution, surface treatment, solid solution treatment, or the like as necessary. Note that one type inorganic fine particles may be used individually, or two or more of types may be used in combination.

[Organic Fine Particles]

Unlike the certain particulate polymer and binder described above, organic fine particles are fine particles composed of a polymer that does not have adhesiveness.

Here, examples of the organic fine particles include particles of various crosslinked polymers such as crosslinked polymethyl methacrylate, crosslinked polystyrene, crosslinked polydivinyl benzene, crosslinked styrene-divinyl benzene copolymer, polystyrene, polyimide, polyamide, polyamide imide, melamine resin, phenolic resin, and benzoguanamine-formaldehyde condensate; particles of heat resistant polymers such as polysulfone, polyacrylonitrile, polyaramid, polyacetal, and thermoplastic polyimide; and modified products and derivatives thereof. Note that one type of organic fine particles may be used individually, or two or more types may be used in combination.

As mentioned above, the organic fine particles are composed of a polymer that does not have adhesiveness. Specifically, the glass transition temperature of the polymer constituting the organic fine particles is preferably 150° C. or higher.

Among the heat-resistant fine particles mentioned above, from the viewpoint of further improving the heat resistance of the device member composed of a laminate, inorganic fine particles or organic fine particles made of a polymer having a glass transition temperature of 150° C. or higher are preferred, inorganic fine particles are more preferred, and particles made of alumina (alumina particles), particles made of baemite (baemite particles), particles made of barium sulfate (barium sulfate particles), and particles made of magnesium hydroxide (magnesium hydroxide particles) are even more preferred.

[Properties of Heat-Resistant Fine Particles]

The volume average particle diameter of the heat-resistant fine particles is preferably 0.1 μm or more, more preferably 0.2 μm or more, and even more preferably 0.3 μm or more, and is preferably 1.0 μm or less, more preferably 0.9 μm or less, and even more preferably 0.8 μm or less. If the volume average particle diameter of the heat-resistant fine particles is 0.1 μm or more, reduction in the ionic conductivity of a functional layer can be suppressed due to excessively dense packing of the heat-resistant fine particles in the functional layer, and the electrochemical device can provide excellent output characteristics. On the other hand, if the volume average particle diameter of the heat-resistant fine particles is 1.0 μm or less, even if the functional layer is made thinner, a device member including a laminate provided with a functional layer can fully exhibit excellent heat resistance. As a result, the capacity of an electrochemical device can be increased while ensuring sufficient heat resistance of the device member.

<Mixing Ratio of Heat-Resistant Fine Particles to Particulate Polymer>

The mixing ratio of the heat-resistant fine particles and the particulate polymer in the composition for a functional layer is preferably 75:25 to 60:40, and more preferably 70:30 to 65:35 in the volume ratio (heat-resistant fine particles: particulate polymer). If the mixing ratio of the heat-resistant fine particles to the particulate polymer is within any of the above range in volume ratio, the functional layer will have a good balance of heat resistance and adhesiveness.

<Other Components>

The composition for a functional layer may optionally further contain other components besides the components described above. Other components are not limited as long as they do not affect electrochemical reactions in an electrochemical element. Examples include known additives such as dispersants, viscosity modifiers, and wetting agents. One of such other components may be used individually, or two or more of such other components may be used in combination.

<Preparation Method of Composition for an Electrochemical Device Functional Layer>

The preparation method of the composition for a functional layer is not particularly limited, and the composition for a functional layer can be prepared, for example, by mixing the particulate polymer, the binder, the heat-resistant fine particles described above, water as a dispersing medium, and other components used as necessary. When the particulate polymer or the binder is prepared by polymerizing a monomer composition in an aqueous solvent, the aqueous dispersion of the particulate polymer or the binder may be mixed with other components as it is. In a situation in which the particulate polymer or the binder is mixed in the form of aqueous dispersion, water in the aqueous dispersion may be used as it is as the dispersion medium.

Although no specific limitations are placed on the mixing method of these components, the mixing is preferably performed using a disperser as a mixing device in order to efficiently disperse the components. The disperser is preferably a device that enables homogeneous dispersion and mixing of the components. Examples of dispersers that can be used include a ball mill, a sand mill, a pigment disperser, a grinding machine, an ultrasonic disperser, a homogenizer, and a planetary mixer.

Furthermore, before the certain particulate polymer described above is mixed with the heat-resistant fine particles and the binder, it is preferable to premix with a dispersant such as nonionic surfactants, anionic surfactants, cationic surfactants, and amphoteric surfactants. Among these, anionic surfactants can be used as a dispersant. Specific examples of anionic surfactants include sulfate ester salts of higher alcohols such as sodium lauryl sulfate, ammonium lauryl sulfate, sodium dodecyl sulfate, ammonium dodecyl sulfate, sodium octyl sulfate, sodium decyl sulfate, sodium tetradecyl sulfate, sodium hexadecyl sulfate, and sodium octadecyl sulfate; alkylbenzenesulfonates such as sodium dodecylbenzenesulfonate, sodium laurylbenzenesulfonate, and sodium hexadecylbenzenesulfonate; and aliphatic sulfonate such as sodium lauryl sulfonate, sodium dodecyl sulfonate, and sodium tetradecyl sulfonate. The amount of the dispersant blended is preferably 0.01 parts by mass or more, more preferably 0.05 parts by mass or more, even more preferably 0.1 parts by mass or more, and is preferably 0.5 parts by mass or less, more preferably 0.4 parts by mass or less, and even more preferably 0.3 parts by mass or less, per 100 parts by mass of the particulate polymer. If the amount of dispersant is more than or equal to any of the above lower limits, the uneven distribution of the particulate polymer in a functional layer can be suppressed and the cycle characteristics of a resulting electrochemical device can be enhanced. If the amount of dispersant is less than or equal to any of the above upper limits, the increase in internal resistance of the resulting electrochemical device can be suppressed and reduction in output characteristics can be prevented.

(Laminate for Electrochemical Device)

A laminate for an electrochemical device includes a substrate and an electrochemical device functional layer formed on the substrate using the composition for a functional layer described above. The electrochemical device functional layer contains at least the particulate polymer, the binder, the heat-resistant fine particles described above, and other components used as needed. Each component contained in the functional layer is the one contained in the composition for a functional layer. The preferred abundance of each component in the functional layer is the same as that in the composition for a functional layer. The laminate for an electrochemical device has excellent post-storage process adhesiveness because it includes a functional layer formed by using the composition for a functional layers described above.

<Substrate>

The substrate may be selected according to the type of electrochemical device component in which a laminate of the present disclosure is used. For example, when the laminate of the present disclosure is used as a separator, a separator substrate is used as the substrate. Alternatively, for example, when the laminate of the present disclosure is used as an electrode, an electrode substrate is used as the substrate.

<<Separator Substrate>>

A known separator substrate such as an organic separator substrate can be used as the separator substrate without any specific limitations. The organic separator is a porous member formed from an organic material and examples of an organic separator substrate include fine porous membranes or non-woven fabric containing a polyolefin-based resin such as polyethylene, polypropylene, polybutene, or polyvinyl chloride, an aromatic polyamide resin, or the like.

Among these, a fine porous membrane made of a polyolefin-based resin are preferred from the viewpoint that the ratio of an electrode active material in an electrochemical device can be increased and the capacity per volume can be increased.

Note that the thickness of the separator substrate can be freely set and is preferably 5 μm or more and 30 μm or less, more preferably 5 μm or more and 20 μm or less, and even more preferably 5 μm or more and 18 μm or less.

<<Electrode Substrate>>

The electrode substrate (positive/negative electrode substrate) is not specifically limited and may, for example, be an electrode substrate obtained by forming an electrode mixed material layer on a current collector.

Here, a current collector, an electrode active material (positive/negative electrode active material), and a binder for an electrode mixed material layer (binder for positive/negative electrode mixed material layer) that are contained in an electrode mixed material layer, and the method by which the electrode mixed material layer is formed on the current collector may be well-known ones, such as those described, for example, in JP 2013-145763 A.

<Manufacturing Method of Laminate>

The manufacturing method of the laminate of the present disclosure is not particularly limited. For example, a functional layer can be formed on a release sheet, and the functional layer can be transferred onto a substrate. However, from the viewpoint of eliminating the transfer process and enhancing manufacturing efficiency, it is preferable to manufacture the laminate through a step of feeding the composition for a functional layer on a substrate (feeding step) and drying the composition for a functional layer fed on the substrate (drying step).

<<Feeding Step>>

In the feeding step, the composition for a functional layer described above is supplied onto a substrate to form a film of the composition for a functional layer on the substrate. The method of feeding the composition for a functional layer on the substrate is not limited, and the composition for a functional layer may be applied to the surface of the substrate, or the substrate may be immersed in the composition for a functional layer. It is preferable to apply the composition for a functional layer to the surface of the substrate because the thickness of the functional layer to be produced can be easily controlled.

Examples of methods by which the composition for a functional layer can be applied onto the substrate include, but are not specifically limited to, doctor blading, reverse roll coating, direct roll coating, gravure coating, bar coating, extrusion coating, and brush coating.

In the feeding step, a film of the composition for a functional layer may be formed on only one side of the substrate, or films of the composition for a functional layer may be formed on both sides of the substrate.

<<Drying Step>>

In the drying step, the film of the composition for a functional layer formed on the substrate in the feeding step is dried to remove the dispersant to form a functional layer.

The coating of the composition for a functional layer can be dried by any known method, e.g., drying by warm, hot, or low-humidity air; vacuum drying; or drying by irradiation with infrared light or electron beams. Although no specific limitations are placed on the drying conditions, the drying temperature is preferably 50° C. to 150° C., and the drying time is preferably 1 minute to 30 minutes.

Upon manufacturing the laminate of the present disclosure, after the functional layer is formed by performing the feeding and drying steps on one side of the substrate, the functional layer may be further formed by performing the feeding and drying steps on the other side of the substrate.

Here, in the functional layer formed from the composition for a functional layer, a plurality of heat-resistant fine particles are usually stacked in the thickness direction of the functional layer. The thickness of the layer of the heat-resistant fine particles stacked in the direction of the thickness of the functional layer (hereinafter also referred to as "heat-resistant fine particle layer") is preferably 0.5 μm or more, more preferably 0.8 μm or more, and even more preferably 1 μm or more, and is preferably 6 μm or less, more preferably 5 μm or less, and even more preferably 3.5 μm or less. If the thickness of the heat-resistant fine particle layer is more than or equal to any of the above lower limits, the heat resistance of the functional layer will be highly improved. On the other hand, if the thickness of the heat-resistant fine particle layer is less than or equal to any of the above upper limits, the ion diffusivity of the functional layer can be secured and the output characteristics of an electrochemical device can be further enhanced.

(Electrochemical Device)

The electrochemical device of the present disclosure includes electrodes and a separator, wherein at least one of the electrodes and the separator is the laminate of the present disclosure. The electrochemical device of the present disclosure has excellent electrochemical properties because the laminate of the present disclosure described above is used as at least a part of any of device members of the electrodes and separator.

The electrochemical device of the present disclosure may be, but is not specifically limited to, a lithium ion secondary battery, an electric double-layer capacitor, and a lithium ion capacitor, and is preferably a lithium ion secondary battery.

Hereinafter, explanation will be given on a case in which the laminate of the present disclosure described above is used as a separator of a lithium ion secondary battery with reference to the lithium ion secondary battery as an example of the electrochemical device of the present disclosure, but the electrochemical device of the present disclosure is not limited to this example.

<Positive Electrode and Negative Electrode>

Electrodes made of known electrode substrates (positive and negative electrode substrates) as described above in the "Substrate" section can be used as the positive electrode and the negative electrode.

<Electrolyte Solution>

As the electrolyte solution, an organic electrolyte solution yielded by dissolving a supporting electrolyte into an organic solvent is normally used. The supporting electrolyte may, for example, be a lithium salt in the case of a lithium ion secondary battery. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Among such lithium salts, $LiPF_6$, $LiClO_4$, and $CF_3SO_3Li$ are preferable because these lithium salts dissolve readily in a solvent and display a high degree of dissociation. Note that one electrolyte may be used individually, or two or more electrolytes may be used in combination. Use of a supporting electrolyte having a high degree of dissociation usually tends to lead to an increase in lithium ion conductivity. Accordingly, lithium ion conductivity can be adjusted through the type of supporting electrolyte that is used.

The organic solvent used in the electrolyte solution may be any organic solvent in which the supporting electrolyte dissolves. Examples of suitable organic solvents that can be used in the case of a lithium ion secondary battery include carbonates such as dimethyl carbonate (DMC), ethylene carbonate (EC), diethyl carbonate (DEC), propylene carbonate (PC), butylene carbonate (BC), methyl ethyl carbonate (ethyl methyl carbonate (EMC)), and vinylene carbonate; esters such as γ-butyrolactone and methyl formate; ethers such as 1,2-dimethoxyethane and tetrahydrofuran; and sulfur-containing compounds such as sulfolane and dimethyl sulfoxide.

Furthermore, a mixed liquid of such solvents may be used. Of these solvents, carbonates are preferable because they have high permittivity and a wide stable potential region. Normally, as the viscosity of the solvent being used is lower, the lithium ion conductivity tends to increase. Hence, the lithium ion conductivity can be adjusted by the type of solvent.

Note that the concentration of the electrolyte in the electrolyte solution may be adjusted as appropriate. Furthermore, known additives may be added to the electrolyte solution.

<Manufacturing Method of Electrochemical Device>

The method of manufacturing the electrochemical devices of the present disclosure is not limited. A lithium ion secondary battery as an example of the electrochemical device of the present disclosure set forth above can be produced by, for example, stacking the positive electrode and the negative electrode with the separator in-between, performing rolling, folding, or the like of the resultant stack as necessary to place the resultant stack in a battery container, injecting the electrolyte solution into the battery container, and sealing the battery container. At least one device member among the positive electrode, the negative electrode, and the separator is the laminate of the present disclosure. In order to prevent pressure increase inside the battery and occurrence of overcharging or overdischarging, an expanded metal; an overcurrent preventing device such as a fuse or a PTC device; or a lead plate may be provided in the battery container as necessary. The shape of the battery may for example be a coin type, a button type, a sheet type, a cylinder type, a prismatic type, or a flat type.

EXAMPLES

The present disclosure will now be described below based on examples. However, the present disclosure is not limited to the examples disclosed herein. In the following, "%" and "parts" used in expressing quantities are by mass, unless otherwise indicated.

Moreover, in the case of a polymer that is produced through copolymerization of a plurality of types of monomers, the proportion constituted by a structural unit formed through polymerization of a given monomer in the polymer is normally, unless otherwise specified, the same as the ratio (charging ratio) of the given monomer among all monomers used in polymerization for forming the polymer.

In the examples and comparative examples, the measurement and evaluation of various properties were performed according to the following.

<Glass Transition Temperature of Particulate Polymer>

Particulate polymers and binders prepared in the examples and comparative examples were used as measurement samples. Into an aluminum pan, 10 mg of a sample to be measured was weighed, which was measured with a differential thermal analysis apparatus ("EXSTAR DSC6220" manufactured by SII NanoTechnology Inc.) using an empty aluminum pan as a reference in the measurement temperature range from −100° C. to 500° C. at a temperature increase rate of 10° C./min under the conditions specified in JIS Z 8703 to obtain a differential scanning calorimetry (DSC) curve. The intersection point of a base line directly before a heat absorption peak on the DSC curve at which a derivative signal (DDSC) was at least 0.05 mW/minute/mg in a heating process and a tangent to the DSC curve at a first inflection point to appear after the heat absorption peak was identified to be used as the glass transition temperature (° C.).

For particulate polymers having a multilayered structure such those having as the inner core portion, the intermediate portion, and the outer shell portion, measurement samples prepared as follows were used. Specifically, monomers and various additives, etc., used in the formation of each portion were used to prepare a corresponding aqueous dispersion containing the polymer that was to form the sample to be measured, under the same polymerization conditions as the conditions used in the formation of each portion. The prepared aqueous dispersion was then solidified by drying, which was used as a measurement sample.

<Volume Average Particle Diameter of Binder>

The volume average particle diameter of the binder prepared in each of the examples was measured by the laser diffraction method. Specifically, an aqueous dispersion (adjusted to a solid content concentration of 0.1 mass %) including the prepared binder was used as a sample. In a (volume-based) particle diameter distribution measured using a laser diffraction particle size analyzer ("LS-230" manufactured by Beckman Coulter, Inc.), the particle diameter D50 at which the cumulative volume calculated from the small diameter end reached 50% was taken to be the volume average particle diameter.

<Volume Average Particle Diameter of Particulate Polymer>

The particulate polymer produced in each of the examples and comparative examples was used as a measurement sample. A quantity equivalent to 0.1 g of the measurement sample was weighed, placed in a beaker, and 0.1 mL of an aqueous solution of alkylbenzenesulfonic acid ("Drywell" manufactured by FUJIFILM Corporation) was added as a dispersant. To the above beaker, 10 to 30 mL of a diluent ("Isoton II" manufactured by Beckman Coulter) was further added and dispersion was performed in a 20-W (watt) ultrasonic dispersion machine for 3 minutes. The volume average particle diameter of the measurement sample was then measured using a particle size analyzer ("Multisizer" manufactured by Beckman Coulter, Inc.) under the following conditions: aperture diameter: 20 μm, medium: Isoton II, number of particles measured: 100,000. The particle diameter (D50) at which the cumulative volume calculated from the small diameter end reached 50% was taken to be the volume average particle diameter.

<Volume Average Particle Diameter of Heat-Resistant Fine Particles>

The particle diameter (D50) at which, in a particle diameter distribution (volume basis) measured by laser diffraction, the cumulative volume calculated from a small diameter end of the distribution reached 50% was used as the volume average particle diameter of heat-resistant fine particles.

<Thickness of Heat-Resistant Fine Particle Layer>

A cross-section of a separator provided with a functional layer was observed using the above field emission scanning electron microscope (FE-SEM), and the thickness of the heat-resistant fine particle layer was calculated from the SEM image obtained. Note that the thickness of the heat-resistant fine particle layer was defined as the distance from the surface of the separator substrate on which the functional layer was formed to the heat-resistant fine particles farthest in the vertical direction.

<Ratio of Volume Average Particle Diameter of Particulate Polymer in Functional Layer to Thickness of Heat-Resistant Fine Particle Layer>

Based on the volume average particle diameter of the particulate polymer in the functional layer and the thickness of the heat-resistant fine particle layer obtained as described above, the ratio of the volume average particle diameter of the particulate polymer in the functional layer to the thickness of the heat-resistant fine particle layer (volume average particle diameter of particulate polymer/thickness of heat-resistant fine particle layer) was determined.

<Volume Ratio and Mass Ratio of Heat-Resistant Fine Particles to Particulate Polymer>.

The volume ratio (heat-resistant fine particles/particulate polymer) and the mass ratio (heat-resistant fine particles/particulate polymer) of the heat-resistant fine particles to the particulate polymer were determined from the charged amounts of the heat-resistant fine particles (alumina/organic fine particles) and the particulate polymer when a slurry composition was prepared. Note that 4 g/cm$^3$ was used as the value of the density of alumina. In addition, the density of the organic particles used as heat-resistant particles in Example 12 was calculated as 1.

<Dry Adhesiveness>

A positive electrode, a negative electrode, and separators provided with a functional layer made in the examples and comparative examples were cut into a piece of 10 mm in width and 50 mm in length, and the positive electrode and a separator provided with the functional layer were laminated and pressed using a roll press under the conditions of a temperature of 60° C., a load of 8 kN/m, and a press speed of 30 m/min to obtain a laminate in which the positive electrode and the separator provided with the functional layer were laminated. Note that the positive electrode and the separator provided with the functional layer were stacked so that the positive electrode and the top surface of the separator provided with the functional layer faced each other. Note that used separators with the functional layer were those immediately after fabrication.

A cellophane tape was then attached to the surface of the obtained laminate with the surface of the current collector side of the positive electrode facing down. Tape stipulated by JIS Z1522 was used as the cellophane tape. The cellophane tape was fixed to a horizontal test bed. Next, one end of the separator provided with the separator was pulled vertically upward at a pulling speed of 50 mm/minute to peel off the separator, and the stress during this peeling was measured.

Operations similar to the operations for the positive electrode were also performed on the negative electrode prepared in the examples and comparative examples, and the stress was measured. Note that the negative electrode and the separator provided with the functional layer were stacked so that the negative electrode and the back surface of the separator provided with the functional layer faced each other.

The above stress measurements were performed three times for the laminate of the positive electrode and the separator provided with the functional layer, and three times for the laminate of the negative electrode and the separator provided with the functional layer, totaling six times, and the average of the stresses was determined, and the obtained average was used as the peel strength (N/m).

The calculated peel strength was then used to evaluate the dry adhesiveness between the electrode and the separator provided with the functional layer according to the following criteria. A higher peel strength indicated that the functional layer had superior dry adhesiveness (adhesiveness between battery components via the functional layer when not immersed in an electrolyte solution during the manufacturing process of a secondary battery).

A: Peel strength was 3 N/m or more

B: the peel strength was 2 N/m or more or and less than 3 N/m

C: Peel strength was 1 N/m or more and less than 2 N/m

D: Peel strength was less than 1 N/m

<Post-Storage Process Adhesiveness>

A positive electrode, a negative electrode, and separators provided with a functional layer made in the examples and comparative examples were cut into a piece of 10 mm in width and 50 mm in length, and the positive electrode and a separator provided with the functional layer were laminated and pressed using a roll press under the conditions of a temperature of 60° C., a load of 8 kN/m, and a press speed of 30 m/min to obtain a laminate in which the positive electrode and the separator provided with the functional layer were laminated. Note that the positive electrode and the separator provided with the functional layer were stacked so that the positive electrode and the top surface of the separator provided with the functional layer faced each other. Note that a separator with a functional layer that had been placed under the condition of 40° C. and 50% RH for 168 hours was used.

A cellophane tape was then attached to the surface of the obtained laminate with the surface of the current collector side of the positive electrode facing down. Tape stipulated by JIS Z1522 was used as the cellophane tape. The cellophane tape was fixed to a horizontal test bed. Next, one end of the separator provided with the separator was pulled vertically upward at a pulling speed of 50 mm/minute to peel off the separator, and the stress during this peeling was measured.

Operations similar to the operations for the positive electrode were also performed on the negative electrode prepared in the examples and comparative examples, and the stress was measured. Note that the negative electrode and the separator provided with the functional layer were stacked so that the negative electrode and the back surface of the separator provided with the functional layer faced each other.

The above stress measurements were performed three times for the laminate of the positive electrode and the separator provided with the functional layer, and three times for the laminate of the negative electrode and the separator provided with the functional layer, totaling six times, and the average of the stresses was determined, and the obtained average was used as the peel strength (N/m).

The calculated peel strength was then used to evaluate the adhesiveness between the electrode and the separator provided with the functional layer according to the following criteria. A higher peel strength indicated that the functional layer had superior post-storage process adhesiveness (adhesiveness between battery components via the functional layer in a dry state not immersed in an electrolyte solution after a certain time of storage after formation of the functional layer during a manufacturing process of the secondary battery).

A: Peel strength was 3 N/m or more

B: the peel strength was 2 N/m or more or and less than 3 N/m

C: Peel strength was 1 N/m or more and less than 2 N/m

D: Peel strength was less than 1 N/mm

<Blocking Resistance of Functional Layer>

The separator provided with the functional layer made in the examples and comparative examples were cut into two pieces of 4 cm in width×4 cm in length to be used as test specimens. The two test pieces obtained were stacked so that the functional layer sides faced each other, and then pressed using a flat plate press at a temperature of 40° C. and a load of 8 kN for 2 minutes to obtain a pressed body. The stress when one end of the pressed body was fixed and the other end of the pressed body was peeled off by pulling vertically upward at a tensile speed of 50 mm/min. The stress obtained was used as the blocking strength. The blocking strength was then evaluated according to the following criteria. A smaller blocking strength indicated that the functional layer more favorably suppressed the occurrence of blocking, i.e., had a better blocking resistance of the functional layer.

A: less than 2 N/m

B: 2 N/m or more and less than 3 N/m

C: 3 N/m or more and less than 4 N/m

D: 4 N/m or more

<Electrolyte Solution Injectability>

An electrolyte solution was poured into the lithium ion second batteries made in the examples and comparative examples. The inside of the lithium ion second battery was then depressurized to −100 kPa and that state was kept for 1 minute. Heat sealing was then performed. After 10 minutes, the electrode (positive electrode) was removed and the state of impregnation with the electrolyte solution to the electrode was visually observed. The evaluation was made according to the following criteria. A greater area of the electrode impregnated with the electrolyte solution indicated a higher electrolyte solution injectability.

A: All surfaces of the electrode were impregnated with the electrolyte solution.

B: Less than 1 $cm^2$ of the electrode remained unimpregnated with the electrolyte solution (except for the state where all surfaces were impregnated).

C: 1 $cm^2$ or more of the electrode remained unimpregnated with the electrolyte solution.

<Cycle Characteristics of Secondary Battery>

A lithium ion secondary battery produced in each of the examples and the comparative examples was left for 5 hours at a temperature of 25° C. after being filled with an electrolyte solution. Next, the lithium ion secondary battery was charged to a cell voltage of 3.65 V by a 0.2 C constant-current method at a temperature of 25° C., and was then subjected to aging treatment for 12 hours at a temperature of 60° C. The lithium ion secondary battery was subsequently discharged to a cell voltage of 3.00 V by a 0.2 C constant-current method at a temperature of 25° C. Thereafter, CC-CV charging of the lithium ion secondary battery was performed by a 0.2 C constant-current method (upper limit cell voltage 4.20 V) and CC discharging of the lithium ion secondary battery was performed to 3.00 V by a 0.2 C constant-current method. This charging and discharging at 0.2 C was repeated 3 times.

Next, 100 cycles were carried out of an operation in which the lithium ion secondary battery was charged and discharged between a cell voltage of 4.20 V and a cell voltage of 3.00 V with a charge/discharge rate of 1.0 C at an ambient temperature of 25° C. The discharge capacity of the $1^{st}$ cycle was defined as X1 and the discharge capacity of the $100^{th}$ cycle was defined as X2.

The capacity maintenance rate indicated by $\Delta C'=(X2/X1)\times 100(\%)$ was determined using the discharge capacity X1 and the discharge capacity X2, and was evaluated according to the following criteria. A larger value for the capacity maintenance rate ΔC' indicated better cycle characteristics upon 100 cycles. Note that excellent cycle characteristics of the secondary battery upon 100 cycles are presumably due to the fact that the functional layer provided in the secondary battery can suitably retain the electrolyte solution.

A: the capacity maintenance rate ΔC' was 93% or more

B: the capacity maintenance ΔC' was 90% or more to less than 93%

C: the capacity maintenance ΔC' was less than 90%

Example 1

<Preparation of Particulate Polymer (S)>

[Preparation of Monomer Composition (A) for Inner Core Portion]

A monomer composition (A) for the inner core portion was prepared by mixing 40.8 parts of styrene as an aromatic vinyl monomer, 7.15 parts of 2-ethylhexyl acrylate as a (meth)acrylic acid ester monomer, and 0.05 parts of ethylene glycol dimethacrylate as a cross-linkable monomer.

[Preparation of Monomer Composition (B) for Intermediate Portion]

A monomer composition (B) for the intermediate portion was prepared by mixing 20.8 parts of styrene as an aromatic vinyl monomer, 8 parts of 2-ethylhexyl acrylate as a (meth) acrylic acid ester monomer, and 3.2 parts of glycidyl methacrylate as an epoxy group-containing unsaturated monomer.

[Preparation of Monomer Composition (C) for Outer Shell Portion]

A monomer composition (C) for the outer shell portion was prepared by mixing 19 parts of methyl methacrylate as a (meth)acrylic acid ester monomer and 1 part of allyl methacrylate as a cross-linkable monomer.

[Preparation of Metal Hydroxide]

A colloidal dispersion solution (A) containing magnesium hydroxide as a metal hydroxide was prepared by gradually adding under stirring an aqueous solution (A2) containing 5.6 parts of sodium hydroxide in 50 parts of deionized water to an aqueous solution (A1) containing 8.0 parts of magnesium chloride dissolved in 200 parts of deionized water.

[Suspension Polymerization]

A particulate polymer was prepared by suspension polymerization. Specifically, the monomer composition (A) for the inner core portion obtained as described above was fed into the above-described colloidal dispersion solution (A) containing magnesium hydroxide, and after further stirring, 2.0 parts of t-butyl peroxy-2-ethyl hexanoate ("Perbutyl 0" manufactured by NOF Corporation) as a polymerization initiator was added to obtain a mixed solution. The resulting mixed solution was dispersed under high-shear agitating for 1 minute at 15,000 rpm using an in-line emulsification-dispersion machine ("CAVITRON" manufactured by Pacific Machinery & Engineering Co., Ltd.) to form droplets of the monomer composition (A) for the inner core portion in the colloidal dispersion solution (A) containing magnesium hydroxide.

The colloidal dispersion solution (A) containing magnesium hydroxide, in which droplets of the above monomer composition (A) for the inner core portion had been formed, was placed in a reactor and the temperature was raised to 90° C. to conduct the polymerization reaction. When the polymerization conversion rate reached 90% or more, the monomer composition (B) for the intermediate portion was added. After the addition of the monomer composition for the intermediate portion (B), when the polymerization conversion rate again reached 95% or more, 0.1 part of the monomer composition for the outer shell portion (C) and 2,2'-azobis[2-methyl-N-(2-hydroxyethyl)-propionamide] (product name: VA-086, manufactured by Wako Pure Chemicals, water-soluble initiator), which was the polymerization initiator for the outer shell portion, dissolved in 10 parts of deionized water, were added. After the reaction was continued at 90° C. for 4 hours, the reaction was stopped by water cooling to thereby obtain an aqueous dispersion containing the particulate polymer.

Furthermore, while the aqueous dispersion containing the above particulate polymer was stirred, sulfuric acid was added dropwise at room temperature (25° C.) and acid washing was performed until the pH became 6.5 or lower. Then, filtration separation was performed, and 500 parts of deionized water were added to the resulting solid content to reslurry, and the water washing process (washing, filtration, and dehydration) was repeated several times. Then, filtration separation was performed, and the resulting solid content was placed in a vessel of a dryer and dried at 40° C. for 48 hours to obtain dry particulate polymer.

The glass transition temperature and the volume average particle diameter of the resultant particulate polymer were measured. The results are summarized in Table 1.

<Preparation of Aqueous Dispersion Containing Binder (α)>

A reaction vessel equipped with a stirrer was charged with 70 parts of deionized water, 0.15 parts of sodium lauryl sulfate ("EMAL® 2F" (EMAL is a registered trademark in Japan, other countries, or both) produced by Kao Chemical Corporation) as an emulsifier, and 0.5 parts of ammonium persulfate as a polymerization initiator. The gas phase of the reaction vessel was purged with nitrogen gas and the contents of the reaction vessel were heated to 60° C.

Meanwhile, in a separate vessel, 50 parts of deionized water, 0.5 parts of sodium dodecylbenzenesulfonate as a dispersion stabilizer, 94 parts of n-butyl acrylate as a (meth) acrylic acid ester monomer, 2 parts of methacrylic acid as an acid group-containing monomer, and 2 parts of acrylonitrile as a nitrile group-containing monomer, 1 part of allyl methacrylate as a cross-linkable monomer, and 1 part of allyl glycidyl ether as an epoxy group-containing unsaturated monomer were mixed to prepare a monomer composition (α).

The resulting monomer composition (α) was continuously added to the reactor equipped with the stirrer described above over a period of 4 hours to carry out polymerization. A reaction was carried out at 60° C. during the addition. After the addition was complete, stirring was carried out for a further 3 hours at 70° C. to complete the reaction and yield an aqueous dispersion containing a particulate binder (α) as an acrylic polymer. The obtained binder (α) had a volume average particle diameter D50 of 0.25 μm and a glass transition temperature of −40° C.

<Preparation of Slurry Composition (Composition for Functional Layer)>

To 100 parts of alumina ("AKP3000" manufactured by SUMITOMO CHEMICAL COMPANY, LIMITED, volume average particle diameter: 0.7 μm) as heat-resistant fine particles, 0.5 parts of polyacrylic acid as a water-soluble polymer were added, and deionized water was added so that the solid concentration was 55%, and mixing was carried out using a ball mill to prepare a pre-mixing slurry.

To 100 parts of the particulate polymer, 0.2 parts of sodium dodecylbenzenesulfonate ("Neoperex G-15" manufactured by Kao Chemical Corporation) as a dispersant was added. In addition, 6 parts of the aqueous dispersion containing the binder (α) per 100 parts of the heat-resistant fine particles in terms of solid content and 1.5 parts of carboxymethylcellulose as a thickening agent were mixed so that the solid concentration was 40%, and the resulting mixed liquid was added to the pre-mixing slurry obtained as described above. Deionized water was further added so that the solid concentration was 40% to obtain a slurry composition (composition for a functional layer).

Note that the volume ratio of heat-resistant fine particles (alumina) to the particulate polymer in the slurry composition (heat-resistant fine particles/particulate polymer) was 70/30.

<Preparation of Separator Provided with Functional Layer (Gravure Coating Method)

A file porous substrate made from polyethylene was prepared as a separator substrate (thickness: 12 μm). Then, application of the above slurry composition to one side of the separator substrate, drying of the coating film (film) formed on the separator substrate, conveyance of the separator substrate having the pre-functional layer formed thereon, and collection by winding it onto a collection roll were continuously performed using the roll-to-roll method. Note that the application of the slurry composition to one side of the separator substrate was carried out by the gravure coating method. Drying of the coating was performed at 50° C. The conveyance speed of the separator substrate was set to 15 m/min. During conveyance of the separator substrate, a tension of 20 $N/mm^2$ was applied in the longitudinal direction of the separator substrate having the pre-functional layer formed thereon. The operation similar to the above was performed on the other side of the separator substrate to produce a separator with functional layers, where the thickness of the heat-resistant fine particle layer is 2.0 μm on both sides of the separator substrate. All samples except those for dry adhesiveness evaluation were stored for 168 hours under condition of 40° C. and 50% RH. They were then used for each evaluation.

<Production of Positive Electrode>

100 parts of $LiCoO_2$ as a positive electrode active material (volume average particle diameter: 12 μm), 2 parts of acetylene black ("HS-100" manufactured by Denka Company Ltd.) as a conductor, 2 parts in terms of solid content of polvinylidene difluoride ("#7208" manufactured by KUREHA Corporation) as a binder for a positive electrode mixed material layer, and N-methyl pyrrolidone as a solvent were mixed to a total solid content concentration of 70%. These materials were mixed with a planetary mixer to prepare a slurry composition for a positive electrode.

A comma coater was used to apply the slurry composition for a positive electrode onto aluminum foil of 20 μm in thickness, as a current collector, so as to have a thickness of approximately 150 μm after drying. This drying was performed by conveying the aluminum foil through an oven at 60° C. at a rate of 0.5 m/min over 2 minutes. Thereafter, heat treatment was performed for 2 minutes at 120° C. to obtain a pre-pressing positive electrode web. The pre-pressing positive electrode web was rolled by roll pressing to obtain a post-pressing positive electrode including a positive electrode mixed material layer (thickness: 80 μm).

<Production of Negative Electrode>

A 5 MPa pressure vessel equipped with a stirrer was charged with 33 parts of 1,3-butadiene, 3.5 parts of itaconic acid, 63.5 parts of styrene, 0.4 parts of sodium dodecylbenzenesulfonate as an emulsifier, 150 parts of deionized water, and 0.5 parts of potassium persulfate as a polymerization initiator. The contents of the pressure vessel were sufficiently stirred and were then heated to 50° C. to initiate polymerization. Once the polymerization conversion rate reached 96%, the reaction was stopped by cooling to yield a mixture containing a binder for a negative electrode mixed material layer (SBR). This mixture containing the binder for a negative electrode mixed material layer was adjusted to pH 8 through addition of 5% sodium hydroxide aqueous solution. Thereafter, unreacted monomers were removed from the mixture by heated vacuum distillation. Thereafter, the mixture was cooled to 30° C. or lower to obtain an aqueous dispersion containing the target binding material for a negative electrode mixed material layer.

Next, 80 parts of synthetic graphite (volume average particle diameter: 15.6 μm) as a negative electrode active material (1), 16 parts of a silicon-based active material SiOx (volume average particle diameter: 4.9 μm) as the negative electrode active material (2) were blended. After 2.5 part in solid content equivalent of a 2% water solution of sodium salt of carboxymethyl cellulose ("MAC350HC" manufactured by Nippon Paper Industries Co., Ltd.) as a viscosity modifier, and deionized water were mixed and adjusted to a solid content concentration of 68%, and the mixture was further mixed for 60 minutes at 25° C. Subsequently, deionized water was added to adjust the solid content concentration to 62%, and then the mixture was further mixed at 25° C. for 15 minutes to obtain a mixed solution. Next, 1.5 parts in solid equivalents of the water dispersion containing the above-mentioned binder for a negative electrode mixed material layer and deionized water were added to this mixed solution, the final solid content concentration was adjusted to 52%, and mixing was performed for a further 10 minutes. This mixed solution was subjected to a defoaming process under reduced pressure to yield a slurry composition for a negative electrode having good fluidity.

The above-described slurry composition for a negative electrode was applied onto copper foil of 20 nm in thickness, as a current collector, using a comma coater such as to have a film thickness after drying of approximately 150 μm. This drying was performed by conveying the copper foil through an oven at 60° C. at a rate of 0.5 m/min over 2 minutes. Thereafter, heat treatment was performed for 2 minutes at 120° C. to obtain a pre-pressing negative electrode web. The negative electrode pre-pressing web was rolled with a roll press to afford a post-press negative electrode having the negative electrode mixed material layer (thickness: 80 μm).

Using the separator provided with the functional layers obtained as described above, the volume average particle diameter of the particulate polymer in the functional layer, the thickness of the heat-resistant fine particle layer, and the ratio of the volume average particle diameter of the particulate polymer to the thickness of the heat-resistant fine particle layer were determined. In addition, using the separator provided with the functional layers, the positive electrode, and the negative electrode obtained as described above, the dry adhesiveness of the functional layer, the process adhesiveness after storage of the separator, and the blocking resistance were evaluated. The results are summarized in Table 1.

<Production of Lithium Ion Secondary Battery>

The post-pressing positive electrode that was obtained as described above was cut out as a 49 cm×5 cm rectangle and was placed with the surface at the positive electrode mixed material layer side of the positive electrode on top. The separator provided with the functional layers which had been cut out to 120 cm×5.5 cm in size was placed on the positive electrode mixed material layer such that the positive electrode was positioned on one side in the longitudinal direction of the separator provided with the functional layers. The post-pressing negative electrode that was obtained as described above was cut out as a 50 cm×5.2 cm rectangle and was placed on the separator provided with the functional layers such that the surface at the negative electrode mixed material layer side of the negative electrode faced the separator provided with the functional layers and such that the negative electrode was positioned on the other side in the longitudinal direction of the separator provided with the functional layers. The separator provided with the functional layers was placed so that the top surface of the separator provided with the functional layers faced the positive electrode and the back surface of the separator provided with the functional layers faced the negative electrode. The resultant laminate was wound by a roll to obtain a roll.

The roll was pressed into a flat form at 60° C. and 1 MPa, and was subsequently packed into an aluminum packing case used as a battery case. An electrolyte solution (solvent: ethylene carbonate/diethyl carbonate/vinylene carbonate (volume ratio)=68.5/30/1.5; electrolyte: $LiPF_6$ of 1 mol in concentration) was injected into the aluminum packing case such that no air remained. Then, the opening of the aluminum packing case was heat-sealed at a temperature of 150° C. to produce a wound lithium ion secondary battery having a capacity of 800 mAh.

The electrolyte solution injectability and the cycle characteristics of the produced lithium ion secondary battery were evaluated. The results are summarized in Table 1.

Example 2

A binder (α), a slurry composition, a separator provided with functional layers, a positive electrode, and a negative electrode were prepared and a lithium ion secondary battery was obtained in the manner similar to Example 1, except that a monomer composition (A-2) for the inner core portion prepared as follows was used in place of the monomer composition (A) for the inner core portion in the preparation of the slurry composition in Example 1. Various measurements and evaluations were then carried out in the manner similar to Example 1. The results are summarized in Table 1. Note that, in the preparation of the monomer composition (A-2) for the inner core portion, 34.56 parts of styrene as an aromatic vinyl monomer, 13.39 parts of 2-ethylhexyl acrylate as a (meth)acrylic acid ester monomer, and 0.05 parts of ethylene glycol dimethacrylate as a cross-linkable monomer were mixed.

Example 3

A binder (α), a slurry composition, a separator provided with functional layers, a positive electrode, and a negative electrode were prepared and a lithium ion secondary battery was obtained in the manner similar to Example 1, except that a monomer composition for the inner core portion (A-3) prepared as follows was used in place of the monomer composition for the inner core portion (A) and a monomer composition for the intermediate portion (B-3) prepared as follows was used in place of the monomer composition for the intermediate portion (B) in the preparation of the slurry composition of Example 1. Various measurements and evaluations were then carried out in the manner similar to Example 1. The results are summarized in Table 1. Note that, in preparation of the monomer composition (A-3) for the inner core portion, 30.72 parts of styrene as an aromatic vinyl monomer, 17.23 parts of 2-ethylhexyl acrylate as a (meth)acrylic acid ester monomer, and 0.05 parts of ethylene glycol dimethacrylate as a cross-linkable monomer were mixed. In addition, in the preparation of the monomer composition (B-3) for the intermediate portion, 16 parts of styrene as an aromatic vinyl monomer, 12.8 parts of 2-ethylhexyl acrylate as a (meth)acrylic acid ester monomer, and 3.2 parts of glycidyl methacrylate as an epoxy group-containing unsaturated monomer were mixed.

Example 4

A binder (α), a slurry composition, a separator provided with functional layers, a positive electrode, and a negative electrode were prepared and a lithium ion secondary battery was obtained in the manner similar to Example 1, except that a monomer composition (B-4) for the intermediate portion prepared as follows was used in place of the monomer composition (B) for the intermediate portion in the preparation of the slurry composition in Example 1. Various measurements and evaluations were then carried out in the manner similar to Example 1. The results are summarized in Table 1. Note that, in the preparation of the monomer composition (B-4) for the intermediate portion, 16 parts of styrene as an aromatic vinyl monomer, 12.8 parts of 2-ethylhexyl acrylate as a (meth)acrylic acid ester monomer, and 3.2 parts of glycidyl methacrylate as an epoxy group-containing unsaturated monomer were mixed in the similar manner to the monomer composition (B-3) for the intermediate portion.

Example 5

A binder (α), a slurry composition, a separator provided with functional layers, a positive electrode, and a negative electrode were prepared and a lithium ion secondary battery was obtained in the manner similar to Example 1, except that a monomer composition (B-5) for the intermediate portion prepared as follows was used in place of the monomer composition (B) for the intermediate portion in the preparation of the slurry composition in Example 1. Various measurements and evaluations were then carried out in the manner similar to Example 1. The results are summarized in Table 1. Note that, in the preparation of the monomer composition (B-5) for the intermediate portion, 12.8 parts of styrene as an aromatic vinyl monomer, 16 parts of 2-ethylhexyl acrylate as a (meth)acrylic acid ester monomer, and 3.2 parts of glycidyl methacrylate as an epoxy group-containing unsaturated monomer were mixed.

Example 6

A binder (α), a slurry composition, a separator provided with functional layers, a positive electrode, and a negative electrode were prepared and a lithium ion secondary battery was obtained in the manner similar to Example 1, except that a monomer composition for the outer shell portion (C-6) prepared as follows was used in place of the monomer composition for the outer shell portion (C) in the preparation of the slurry composition in Example 1. Various measurements and evaluations were then carried out in the manner similar to Example 1. The results are summarized in Table 1. Note that, in preparation of the monomer composition (C-6) for the outer shell portion, 17 parts of methyl methacrylate as a (meth)acrylic acid ester monomer, 2 parts of butyl acrylate, and 1 part of allyl methacrylate as a cross-linkable monomer were mixed.

Example 7

A binder (α), a slurry composition, a separator provided with functional layers, a positive electrode, and a negative electrode were prepared and a lithium ion secondary battery was obtained in the manner similar to Example 1, except that a monomer composition for the inner core portion (A-7) prepared as follows was used in place of the monomer composition for the inner core portion (A), and a monomer composition for the intermediate portion (B-7) was used in place of the monomer composition for the intermediate portion (B) in the preparation of the slurry composition of Example 1. Various measurements and evaluations were then carried out in the manner similar to Example 1. The results are summarized in Table 1. Note that, in preparation of the monomer composition (A-7) for the inner core portion, 30.6 parts of styrene as an aromatic vinyl monomer, 5.36 parts of 2-ethylhexyl acrylate as a (meth)acrylic acid ester monomer, and 0.04 parts of ethylene glycol dimethacrylate as a cross-linkable monomer were mixed. In preparation of the monomer composition for the intermediate portion (B-7), 28.6 parts of styrene as an aromatic vinyl monomer, 11 parts of 2-ethylhexyl acrylate as a (meth) acrylic acid ester monomer, and 4.4 parts of glycidyl methacrylate as an epoxy group-containing unsaturated monomer were mixed.

Example 8

A binder (α), a slurry composition, a separator provided with functional layers, a positive electrode, and a negative electrode were prepared and a lithium ion secondary battery was obtained in the manner similar to Example 1, except that a monomer composition for the inner core portion (A-8) prepared as follows was used in place of the monomer composition for the inner core portion (A) and a monomer composition for the intermediate portion (B-8) was used in place of the monomer composition for the intermediate portion (B) in the preparation of the slurry composition of Example 1. Various measurements and evaluations were then carried out in the manner similar to Example 1. The results are summarized in Table 1. Note that, in preparation of the monomer composition (A-8) for the inner core portion, 64.6 parts of styrene as an aromatic vinyl monomer, 11.32 parts of 2-ethylhexyl acrylate as a (meth)acrylic acid ester monomer, and 0.08 parts of ethylene glycol dimethacrylate as a cross-linkable monomer were mixed. In preparation of the monomer composition (B-8) for the intermediate portion, 2.6 parts of styrene as an aromatic vinyl monomer, 1 part of 2-ethylhexyl acrylate as a (meth)acrylic acid ester monomer, and 0.4 parts of glycidyl methacrylate as an epoxy group-containing unsaturated monomer were mixed.

Example 9

A binder (α), a slurry composition, a separator provided with functional layers, a positive electrode, and a negative electrode were prepared and a lithium ion secondary battery was obtained in the manner similar to Example 1, except that a monomer composition for the inner core portion (A-9) prepared as follows was used in place of a monomer composition for the inner core portion (A), a monomer composition for the intermediate portion (B-9) was used in place of a monomer composition for the intermediate portion (B), and a monomer composition for the outer shell portion (C-9) was used in place of a monomer composition for the outer shell portion (C) in the preparation of the slurry composition of Example 1. Various measurements and evaluations were then carried out in the manner similar to Example 1. The results are summarized in Table 1. Note that, in the preparation of the monomer composition (B-9) for the intermediate portion, 15.6 parts of styrene as an aromatic vinyl monomer, 6 parts of 2-ethylhexyl acrylate as a (meth) acrylic acid ester monomer, and 2.4 parts of glycidyl methacrylate as an epoxy group-containing unsaturated monomer were mixed. In preparation of the monomer composition (C-9) for the outer shell portion, 38 parts of methyl methacrylate as a (meth)acrylic acid ester monomer and 2 parts of allyl methacrylate as a cross-linkable monomer were mixed.

Example 10

A binder (α), a slurry composition, a separator provided with functional layers, a positive electrode, and a negative electrode were prepared and a lithium ion secondary battery was obtained in the manner similar to Example 1, except that a monomer composition for the inner core portion (A-10) was used in place of the monomer composition for the inner core portion (A), a monomer composition for the intermediate portion (B-10) was used in place of the monomer composition for the intermediate portion (B), and a monomer composition (C-10) for the outer shell portion was used in place of the monomer composition (C) for the outer shell portion in the preparation of the slurry composition of Example 1. Various measurements and evaluations were then carried out in the manner similar to Example 1. The results are summarized in Table 2. Note that, in preparation of the monomer composition (A-10) for the inner core portion, 50.5 parts of styrene as an aromatic vinyl monomer, 8.85 parts of 2-ethylhexyl acrylate as a (meth)acrylic acid ester monomer, and 0.05 parts of ethylene glycol dimethacrylate as a cross-linkable monomer were mixed. In preparation of the monomer composition for the intermediate portion (B-10), 25.7 parts of styrene as an aromatic vinyl monomer, 9.9 parts of 2-ethylhexyl acrylate as a (meth) acrylic acid ester monomer, and 4.0 parts of glycidyl methacrylate as an epoxy group-containing unsaturated monomer were mixed. In preparation of the monomer composition (C-10) for the outer shell portion, 0.95 parts of methyl methacrylate as a (meth)acrylic acid ester monomer and 0.05 parts of allyl methacrylate as a cross-linkable monomer were mixed.

Example 11

Monomer compositions for the intermediate portion (B11-1, B11-2, and B11-3) prepared as follows were used instead of the monomer composition for the intermediate portion (B) in the preparation of the slurry composition in Example 1. A binder (α), a slurry composition, a separator provided with functional layers, a positive electrode, and a negative electrode were prepared and a lithium ion secondary battery was obtained in the manner similar to Example 1, except that the monomer composition for the intermediate portion (B11-1) was added when the polymerization conversion rate of the monomer composition for the inner core portion (A) reached 90%, the monomer composition for the intermediate portion (B11-2) was added when the polymerization conversion rate again reached 90% or more, and the monomer composition for the intermediate portion (B11-3) was added when the polymerization conversion rate again reached 90%, during suspension polymerization. Various measurements and evaluations were then carried out in the manner similar to Example 1. The results are summarized in Table 2. Note that, in the preparation of the monomer composition (B11-1) for the intermediate portion, 7.57 parts of styrene as an aromatic vinyl monomer, 2.56 parts of 2-ethylhexyl acrylate as a (meth)acrylic acid ester monomer, and 0.53 parts of glycidyl methacrylate as an epoxy group-containing unsaturated monomer were mixed. In preparation of the monomer composition for the intermediate portion (B11-2), 6.93 parts of styrene as an aromatic vinyl monomer, 2.67 parts of 2-ethylhexyl acrylate as a (meth)acrylic acid ester monomer, and 1.07 parts of glycidyl methacrylate as an epoxy group-containing unsaturated monomer were mixed. In preparation of the monomer composition for the intermediate portion (B11-3), 6.08 parts of styrene as an aromatic vinyl monomer, 2.99 parts of 2-ethylhexyl acrylate as a (meth)acrylic acid ester monomer, and 1.6 parts of glycidyl methacrylate as an epoxy group-containing unsaturated monomer were mixed.

Example 12

A particulate polymer, a binder, a composition for a functional layer, a separator, a negative electrode, a positive electrode, and a lithium ion secondary battery were obtained in the manner similar to Example 1, except that organic fine particles prepared as follows were used instead of alumina particles as heat-resistant fine particles in the preparation of the composition for a functional layer. Each evaluation was performed in the manner similar to Example 1. The results are summarized in Table 2.

<Preparation of Organic File Particles (Heat-Resistant File Particles)>

In reactor A equipped with a stirrer, 0.20 parts of sodium dodecyl sulfate, 0.30 parts of ammonium persulfate, and 180 parts of deionized water were mixed to form a mixture, and the temperature was raised to 65° C. Meanwhile, a monomer composition for seed particles was prepared by mixing 80.0 parts of n-butyl acrylate as a (meth)acrylic acid ester monomer, 10.0 parts of methacrylic acid as an acid group-containing monomer, 10.0 parts of acrylonitrile as a nitrile group-containing monomer, 0.8 parts of sodium dodecyl sulfate, and 40 parts of deionized water in a separate container.

This monomer composition for seed particles was continuously added into the aforementioned reaction vessel A over 4 hours to carry out a polymerization reaction. The temperature in the reactor during the continuous addition of the monomer composition for the seed particles was maintained at 65° C. After the continuous addition was completed, the polymerization reaction was continued at 80° C. for another 3 hours. As a result, an aqueous dispersion of seed particles was obtained. Note that the volume average particle diameter of the seed particles was measured in the same manner as the binding material and was 120 nm.

Next, 20 parts in solid content of the aqueous dispersion of the above-mentioned seed particles (of which 16 parts were n-butyl acrylate units, 2 parts were methacrylic acid units, and 2 parts were acrylonitrile units), 80 parts of ethylene glycol dimethacrylate (product name "Light Ester EG" manufactured by Kyoeisha Chemical Co., Ltd.) as a cross-linkable monomer, 0.8 parts of sodium dodecylbenzenesulfonate, 3.2 parts of t-butylperoxy-2-ethylhexanoate (product name: "Perbuthyl 0" manufactured by NOF Corporation) as a polymerization initiator, and 160 parts of deionized water were mixed and stirred at 35° C. for 12 hours in a reactor equipped with a stirrer, so that the cross-linkable monomer and polymerization initiator were completely absorbed into the seed particles. The temperature in the reactor was then maintained at 90° C. and the polymerization reaction (seed polymerization) was carried out for 5 hours.

Steam was then introduced to remove unreacted monomers and degradation products of the initiator to obtain an aqueous dispersion of organic fine particles. The glass transition temperature of the resulting organic fine particles was measured in the same manner as for the particulate polymer and the binder, but no peak was observed in the measurement temperature range (−100° C. to 200° C.). This confirmed that the glass transition temperature of the organic particles was higher than 200° C.

Example 13

A binder (α), a slurry composition, a separator provided with functional layers, a positive electrode, and a negative electrode were prepared and a lithium ion secondary battery was obtained in the manner similar to Example 1, except that a monomer composition (A-13) for the inner core portion prepared as follows was used in place of the monomer composition (A) for the inner core portion in the preparation of the slurry composition in Example 1. Note that, in preparation of the monomer composition (A-13) for the inner core portion, 9.6 parts of butyl acrylate as a (meth)acrylic acid ester monomer and 38.4 parts of ethylene glycol dimethacrylate as a cross-linkable monomer were mixed. It was confirmed that the glass transition temperature $Tg^A$ of the inner core portion of the particulate polymer was 30° C. or higher, and was higher than the glass transition temperature $Tg^B$ of the intermediate portion by at least 5° C. Various measurements and evaluations were then carried out in the manner similar to Example 1. The results are summarized in Table 2.

Comparison Example 1

<Preparation of Particulate Polymer (A)>

[Preparation of Monomer Composition (A)]

A monomer composition (A) was prepared by mixing 64 parts of styrene as an aromatic vinyl monomer, 35.9 parts of 2-ethylhexyl acrylate as a (meth)acrylic acid ester monomer, and 0.1 part of ethylene glycol dimethacrylate as a cross-linkable monomer.

[Preparation of Metal Hydroxide]

A colloidal dispersion solution (A) containing magnesium hydroxide as metal hydroxide was prepared by gradually adding under stirring an aqueous solution (A2) containing 5.6 parts of sodium hydroxide in 50 parts of deionized water to an aqueous solution (A1) containing 8 parts of magnesium chloride dissolved in 200 parts of deionized water.

[Suspension Polymerization Method]

A particulate polymer (A) was prepared by suspension polymerization. Specifically, the monomer composition (A) obtained as described above was fed into the above-described colloidal dispersion solution (A) containing magnesium hydroxide obtained, and after further stirring, 2.0 parts of t-butyl peroxy-2-ethyl hexanoate ("Perbutyl 0" manufactured by NOF Corporation) as a polymerization initiator was added to obtain a mixed solution. The resulting mixed solution was dispersed under high-shear agitating for 1 minute at 15,000 rpm using an in-line emulsification-dispersion machine ("CAVITRON" manufactured by Pacific Machinery & Engineering Co., Ltd.) to form droplets of the monomer composition (A) in the colloidal dispersion solution (A) containing magnesium hydroxide.

The colloidal dispersion solution (A) containing magnesium hydroxide, in which droplets of the above monomer composition (A) had been formed, was placed in a reactor, the temperature was raised to 90° C., and a polymerization reaction was performed for 5 hours to obtain an aqueous dispersion containing particulate polymer (A). A particulate polymer, a binder, a composition for a functional layer, a separator, a negative electrode, a positive electrode, and a lithium ion secondary battery were otherwise obtained in the manner similar to Example 1. Each evaluation was performed in the manner similar to Example 1. The results are summarized in Table 2.

Comparison Example 2

A particulate polymer was prepared in the same manner as in Comparative Example 1, except that a monomer composition (B) prepared as follows was used in place of the monomer composition (A). The same operations, measurements, and evaluations as in Example 1 were performed, except that this particulate polymer was blended in place of the prescribed particulate polymer in the preparation of the slurry composition (composition for a functional layer). The results are summarized in Table 2. Note that a monomer composition (B) was prepared by mixing 85 parts of styrene as an aromatic vinyl monomer, 14.9 parts of 2-ethylhexyl acrylate as a (meth)acrylic acid ester monomer, and 0.1 parts of ethylene glycol dimethacrylate as a cross-linkable monomer Comparison Example 3

A binder (α), a slurry composition, a separator provided with functional layers, a positive electrode, and a negative electrode were prepared and a lithium ion secondary battery was obtained in the manner similar to Example 1, except that a monomer composition for the inner core portion prepared as follows was used instead of the monomer composition for the inner core portion (A), the monomer composition for the intermediate portion was not used, and a monomer composition for the outer shell portion prepared as follows was used in place of the monomer composition for the outer shell portion (C), in the preparation of the slurry composition of Example 1. Various measurements and evaluations were then carried out in the manner similar to Example 1. The results are summarized in Table 2. Note that, in preparation of the monomer composition for the inner core portion used in this comparison example, 51.2 parts of styrene as an aromatic vinyl monomer, 28.7 parts of 2-ethylhexyl acrylate as a (meth)acrylic acid ester monomer, and 0.1 parts of ethylene glycol dimethacrylate as a cross-linkable monomer were mixed. In preparation of the monomer composition for the outer shell portion used in this comparison example, 19.1 parts of methyl methacrylate as a (meth)acrylic acid ester monomer and 1 part of allyl methacrylate as a cross-linkable monomer were mixed.

Comparison Example 4

A binder (α), a slurry composition, a separator provided with functional layers, a positive electrode, and a negative electrode were prepared and a lithium ion secondary battery was obtained in the manner similar to Example 1, except that a monomer composition for the inner core portion prepared as follows was used in place of the monomer composition for the inner core portion (A), the monomer composition for the intermediate portion was not used, and a monomer composition for the outer shell portion prepared as follows was used in place of the monomer composition for the outer shell portion (C). Various measurements and evaluations were then carried out in the manner similar to Example 1. The results are summarized in Table 2. Note that, in preparation of the monomer composition for the inner core portion used in this comparison example, 68 parts of styrene as an aromatic vinyl monomer, 11.9 parts of 2-ethylhexyl acrylate as a (meth)acrylic acid ester monomer, and 0.1 parts of ethylene glycol dimethacrylate as a cross-linkable monomer were mixed.

Comparison Example 5

A binder (α), a slurry composition, a separator provided with functional layers, a positive electrode, and a negative electrode were prepared and a lithium ion secondary battery was obtained in the manner similar to Example 1, except that a monomer composition for the inner core portion prepared as follows was used in place of the monomer composition for the inner core portion (A). Various measurements and evaluations were then carried out in the manner similar to Example 1. The results are summarized in Table 2. Note that, in preparation of the monomer composition for the inner core portion used in this comparison example, 26.4 parts of styrene as an aromatic vinyl monomer, 21.55 parts of 2-ethylhexyl acrylate as the (meth)acrylic acid ester monomer, and 0.05 parts of ethylene glycol dimethacrylate as a cross-linkable monomer were mixed.

Comparison Example 6

A separator provided with functional layers, a positive electrode, and a negative electrode were prepared and a lithium ion secondary battery was obtained in the manner similar to Example 1, except that a particulate polymer prepared as follows was used in preparing the slurry composition (composition for functional layer). Various measurements and evaluations were then carried out in the manner similar to Example 1. The results are summarized in Table 2. Note that, in preparation of the monomer composition for the inner core portion used in this comparison example, a reactor equipped with an agitator was charged with 100 parts of deionized water and 0.5 parts of ammonium persulfate. The gas phase was replaced with nitrogen gas, and the temperature was raised to 60° C. Meanwhile, in a separate vessel, 50 parts of deionized water, 0.3 parts of sodium dodecylbenzenesulfonate as an emulsifier, 37.88 parts of styrene as an aromatic vinyl monomer, 8.65 parts of 2-ethylhexyl acrylate as a (meth)acrylic acid alkyl ester monomer, 1.4 parts of methacrylic acid (MAA) as an acidic group-containing monomer, and 0.05 parts of ethylene dimethacrylate (EDMA) as a cross-linkable group-containing monomer were mixed to obtain a monomer mixture for the inner core portion. The monomer mixture for the inner core portion was continuously added to the reactor over 4 hours to effect polymerization at 60° C. Polymerization was continued until the polymerization conversion rate reached 96%. Next, a mixture of 19.84 parts of styrene, 8 parts of 2-ethylhexyl acrylate, 3.2 parts of glycidyl methacrylate, and 0.96 parts of methacrylic acid was continuously added to the reactor over a 2-hour period until the polymerization conversion rate was 96%. The temperature was then increased to 80° C. A monomer mixture for the outer shell portion obtained by mixing 3 parts of styrene, 15.9 parts of methyl methacrylate, 1 part of methacrylic acid, and 0.1 parts of ethylene glycol dimethacrylate was continuously fed into that reaction system for 30 minutes to continue polymerization. Once the polymerization conversion rate reached 96%, the reaction was quenched by cooling to prepare an aqueous dispersion containing a particulate polymer. The obtained particulate polymer had a volume average particle diameter D50 of 500 nm.

<Preparation of Slurry Composition (Composition for Functional Layer)>

To 100 parts of alumina ("AKP3000" manufactured by SUMITOMO CHEMICAL COMPANY, LIMITED, volume average particle diameter: 0.7 μm) as heat-resistant fine particles, 0.5 parts of polyacrylic acid as a water-soluble polymer were added, and deionized water was added so that the solid concentration was 55%, and mixing was carried out using a ball mill to prepare a pre-mixing slurry.

To 100 parts of the particulate polymer, 0.2 parts of sodium dodecylbenzenesulfonate ("Neoperex G-15" manufactured by Kao Chemical Corporation) as a dispersant was added. In addition, 6 parts of the aqueous dispersion containing the binder (α) per 100 parts of the heat-resistant fine particles in terms of solid content and 1.5 parts of carboxymethylcellulose as a thickening agent were mixed so that the solid concentration was 40%, and the resulting mixed liquid was added to the pre-mixing slurry obtained as described above. Deionized water was further added so that the solid concentration was 40% to obtain a slurry composition (composition for a functional layer).

Note that the volume ratio of heat-resistant fine particles (alumina) to the particulate polymer in the slurry composition (heat-resistant fine particles/particulate polymer) was 70/30.

Note that, in Table 1,
"ST" indicates styrene; and
"2EHA" indicates 2-ethylhexyl acrylate;
"EDMA" indicates ethylene glycol dimethacrylate;
"GMA" indicates glycidyl methacrylate;
MMA represents methyl methacrylate;
"AMA" indicates allyl methacrylate;
"BA" indicates n-butyl acrylate;
"AN" indicates acrylonitrile;
"MAA" indicates methacrylic acid; and
"AGE" indicates allyl glycidyl ether.

TABLE 1

| | | | Example 1 | Example 2 | Example 3 | Example 4 | Example 5 |
|---|---|---|---|---|---|---|---|
| Particulate polymer | Inner core portion | Glass transition temperature $Tg^A$ [° C.] | 70 | 55 | 45 | 70 | 70 |
| | | Composition | ST/2EHA/EDMA | ST/2EHA/EDMA | ST/2EHA/EDMA | ST/2EHA/EDMA | ST/2EHA/EDMA |
| | | Content proportion [mass %] | 85/14.9/0.1 | 72/27.9/0.1 | 64/35.9/0.1 | 85/14.9/0.1 | 85/14.9/0.1 |
| | Intermediate portion | Glass transition temperature $Tg^B$ [° C.] | 50 | 50 | 35 | 35 | 25 |
| | | Composition | ST/2EHA/GMA | ST/2EHA/GMA | ST/2EHA/GMA | ST/2EHA/GMA | ST/2EHA/GMA |
| | | Content proportion [mass %] | 65/25/10 | 65/25/10 | 50/40/10 | 50/40/10 | 40/50/10 |
| | Outer shell portion | Glass transition temperature $Tg^C$ [° C.] | 100 | 100 | 100 | 100 | 100 |
| | | Composition | MMA/AMA | MMA/AMA | MMA/AMA | MMA/AMA | MMA/AMA |
| | | Content proportion [mass %] | 95/5 | 95/5 | 95/5 | 95/5 | 95/5 |
| | Inner core portion:Intermediate portion [mass basis] | | 60/40 | 60/40 | 60/40 | 60/40 | 60/40 |
| | (Inner core portion + intermediate portion):outer shell portion [mass basis] | | 80/20 | 80/20 | 80/20 | 80/20 | 80/20 |
| | Inner core portion portion/outer shell portion/intermediate portion [mass basis] | | 48/32/20 | 48/32/20 | 48/32/20 | 48/32/20 | 48/32/20 |
| | Volume average particle size [μm] | | 6 | 6 | 6 | 6 | 6 |
| Heat resistant fine particles/particulate polymers [volume basis] | | | 70/30 | 70/30 | 70/30 | 70/30 | 70/30 |
| Binder | Composition | (Type) | BA/AN/AMA/MAA/AGE | BA/AN/AMA/MAA/AGE | BA/AN/AMA/MAA/AGE | BA/AN/AMA/MAA/AGE | BA/AN/AMA/MAA/AGE |
| | Amount added | [parts by mass; per 100 parts of heat-resistant fine particles] | 6 | 6 | 6 | 6 | 6 |
| Heat-resistant fine particle | Type | | Alumina | Alumina | Alumina | Alumina | Alumina |
| | Volume average particle size [μm] | | 0.7 | 0.7 | 0.7 | 0.7 | 0.7 |
| Functional layer | Thickness of heat-resistant fine particle layer [μm] | | 2 | 2 | 2 | 2 | 2 |
| | Particulate polymer/heat-resistant fine particle layer thickness ratio [—] | | 3 | 3 | 3 | 3 | 3 |
| Evaluation | Dry adhesiveness | | A | A | A | A | A |
| | Post-storage process adhesiveness | | A | B | B | A | B |
| | Blocking resistance | | A | A | B | B | B |
| | Electrolyte solution injectability | | A | A | B | A | A |
| | Cycle characteristics | | A | A | B | A | B |

| | | | Example 6 | Example 7 | Example 8 | Example 9 | Example 10 |
|---|---|---|---|---|---|---|---|
| Particulate polymer | Inner core portion | Glass transition temperature $Tg^A$ [° C.] | 70 | 70 | 70 | 70 | 70 |
| | | Composition | ST/2EHA/EDMA | ST/2EHA/EDMA | ST/2EHA/EDMA | ST/2EHA/EDMA | ST/2EHA/EDMA |
| | | Content proportion [mass %] | 85/14.9/0.1 | 85/14.9/0.1 | 85/14.9/0.1 | 85/14.9/0.1 | 85/14.9/0.1 |
| | Intermediate portion | Glass transition temperature $Tg^B$ [° C.] | 50 | 50 | 50 | 50 | 50 |
| | | Composition | ST/2EHA/GMA | ST/2EHA/GMA | ST/2EHA/GMA | ST/2EHA/GMA | ST/2EHA/GMA |
| | | Content proportion [mass %] | 65/25/10 | 65/25/10 | 65/25/10 | 65/25/10 | 65/25/10 |
| | Outer shell portion | Glass transition temperature $Tg^C$ [° C.] | 70 | 100 | 100 | 100 | 100 |
| | | Composition | MMA/BA/AMA | MMA/AMA | MMA/AMA | MMA/AMA | MMA/AMA |
| | | Content proportion [mass %] | 85/10/5 | 95/5 | 95/5 | 95/5 | 95/5 |

TABLE 1-continued

| | | | | | | | |
|---|---|---|---|---|---|---|---|
| | Inner core portion:Intermediate portion [mass basis] | | 60/40 | 45/55 | 95/5 | 60/40 | 60/40 |
| | (Inner core portion + intermediate portion):outer shell portion [mass basis] | | 80/20 | 80/20 | 80/20 | 60/40 | 99/1 |
| | Inner core portion portion/outer shell portion/intermediate portion [mass basis] | | 48/32/20 | 36/44/20 | 76/4/20 | 36/24/40 | 59.4/39.6/1 |
| | Volume average particle size [μm] | | 6 | 6 | 6 | 6 | 6 |
| Heat resistant fine particles/particulate polymers [volume basis] | | | 70/30 | 70/30 | 70/30 | 70/30 | 70/30 |
| Binder | Composition | (Type) | BA/AN/AMA/MAA/AGE | BA/AN/AMA/MAA/AGE | BA/AN/AMA/MAA/AGE | BA/AN/AMA/MAA/AGE | BA/AN/AMA/MAA/AGE |
| | Amount added | [parts by mass; per 100 parts of heat-resistant fine particles] | 6 | 6 | 6 | 6 | 6 |
| Heat-resistant fine particle | Type | | Alumina | Alumina | Alumina | Alumina | Alumina |
| | Volume average particle size [μm] | | 0.7 | 0.7 | 0.7 | 0.7 | 0.7 |
| Functional layer | Thickness of heat-resistant fine particle layer [μm] | | 2 | 2 | 2 | 2 | 2 |
| | Particulate polymer/heat-resistant fine particle layer thickness ratio [—] | | 3 | 3 | 3 | 3 | 3 |
| Evaluation | Dry adhesiveness | | A | A | B | B | A |
| | Post-storage process adhesiveness | | A | B | B | B | B |
| | Blocking resistance | | B | A | A | A | B |
| | Electrolyte solution injectability | | A | A | A | B | A |
| | Cycle characteristics | | A | B | A | A | A |

TABLE 2

| | | | Example 11 | Example 12 | Example 13 | Comparative Example 1 | Comparative Example 2 |
|---|---|---|---|---|---|---|---|
| Particulate polymer | Inner core portion | Glass transition temperature $Tg^A$ [° C.] | 70 | 70 | Not detected | 45 | 70 |
| | | Composition | ST/2EHA/EDMA | ST/2EHA/EDMA | EDMA/BA | ST/2EHA/EDMA | ST/2EHA/EDMA |
| | | Content proportion [mass %] | 85/14.9/0.1 | 85/14.9/0.1 | 80/20 | 64/35.9/0.1 | 85/14.9/0.1 |
| | Interme-diate portion | Glass transition temperature $Tg^B$ [° C.] | (shell side) 45/50/55 (inner core portion side) | 50 | 50 | None | None |
| | | Composition | ST/2EHA/GMA | ST/2EHA/GMA | ST/2EHA/GMA | None | None |
| | | Content proportion [mass %] | Shell side 57/28/15 65/25/10 71/24/5 Inner core portion side | 65/25/10 | 65/25/10 | — | — |
| | Outer shell portion | Glass transition temperature $Tg^C$ [° C.] | 100 | 100 | 100 | None | None |
| | | Composition | MMA/AMA | MMA/AMA | MMA/AMA | None | None |
| | | Content proportion [mass %] | 95/5 | 95/5 | 95/5 | — | — |
| | Inner core portion:Intermediate portion [mass basis] | | 60/40 | 60/40 | 60/40 | 100/0 | 100/0 |
| | (Inner core portion + intermediate portion):outer shell portion [mass basis] | | 80/20 | 80/20 | 80/20 | 100/0 | 100/0 |
| | Inner core portion portion/outer shell portion/intermediate portion [mass basis] | | 48/32/20 | 48/32/20 | 48/32/20 | 100/0/0 | 100/0/0 |
| | Volume average particle size [μm] | | 6 | 6 | 6 | 6 | 6 |
| Heat resistant fine particles/particulate polymers [volume basis] | | | 70/30 | 70/30 | 70/30 | 70/30 | 70/30 |
| Binder | Composition | (Type) | BA/AN/AMA/MAA/AGE | BA/AN/AMA/MAA/AGE | BA/AN/AMA/MAA/AGE | BA/AN/AMA/MAA/AGE | BA/AN/AMA/MAA/AGE |
| | Amount added | [parts by mass; per 100 parts of heat-resistant fine particles] | 6 | 6 | 6 | 6 | 6 |
| Heat-resistant fine particle | Type | | Alumina | Organic file particle | Alumina | Alumina | Alumina |
| | Volume average particle size [μm] | | 0.7 | 0.2 | 0.7 | 0.7 | 0.7 |
| Functional layer | Thickness of heat-resistant fine particle layer [μm] | | 2 | 2 | 2 | 2 | 2 |
| | Particulate polymer/heat-resistant fine particle layer thickness ratio [—] | | 3 | 3 | 3 | 3 | 3 |
| Evaluation | Dry adhesiveness | | A | A | A | A | D |
| | Post-storage process adhesiveness | | A | A | A | C | D |
| | Blocking resistance | | A | A | A | D | A |
| | Electrolyte solution injectability | | A | A | A | C | B |
| | Cycle characteristics | | A | A | A | C | B |

TABLE 2-continued

| | | | Comparative Example 3 | Comparative Example 4 | Comparative Example 5 | Comparative Example 6 |
|---|---|---|---|---|---|---|
| Particulate polymer | Inner core portion | Glass transition temperature $Tg^A$ [° C.] | 45 | 70 | 30 | 66 |
| | | Composition | ST/2EHA/EDMA | ST/2EHA/EDMA | ST/2EHA/EDMA | ST/2EHA/MAA/EDMA |
| | | Content proportion [mass %] | 64/35.9/0.1 | 85/14.9/0.1 | 55/44.9/0.1 | 78.9/18/3/0.1 |
| | Intermediate portion | Glass transition temperature $Tg^B$ [° C.] | — | — | 50 | 50 |
| | | Composition | — | — | ST/2EHA/GMA | ST/2EHA/GMA/MAA |
| | | Content proportion [mass %] | — | — | 65/25/10 | 62/25/10/3 |
| | Outer shell portion | Glass transition temperature $Tg^C$ [° C.] | 100 | 100 | 100 | 100 |
| | | Composition | MMA/AMA | MMA/AMA | MMA/AMA | ST/MMA/MAA/EDMA |
| | | Content proportion [mass %] | 95/5 | 95/5 | 95/5 | 15/79.5/5/0.5 |
| | Inner core portion:Intermediate portion [mass basis] | | | | 60/40 | 60/40 |
| | (Inner core portion + intermediate portion):outer shell portion [mass basis] | | 80/20 | 80/20 | 80/20 | 80/20 |
| | Inner core portion portion/outer shell portion/intermediate portion [mass basis] | | 80/0/20 | 80/0/20 | 48/32/20 | 48/32/20 |
| | Volume average particle size [µm] | | 6 | 6 | 6 | 0.5 |
| Heat resistant fine particles/particulate polymers [volume basis] | | | 70/30 | 70/30 | 70/30 | 70/30 |
| Binder | Composition | (Type) | BA/AN/AMA/MAA/AGE | BA/AN/AMA/MAA/AGE | BA/AN/AMA/MAA/AGE | BA/AN/AMA/MAA/AGE |
| | Amount added | [parts by mass; per 100 parts of heat-resistant fine particles] | 6 | 6 | 6 | 6 |
| Heat-resistant fine particle | Type | | Alumina | Alumina | Alumina | Alumina |
| | Volume average particle size [µm] | | 0.7 | 0.7 | 0.7 | 0.7 |
| Functional layer | Thickness of heat-resistant fine particle layer [µm] | | 2 | 2 | 2 | 2 |
| | Particulate polymer/heat-resistant fine particle layer thickness ratio [—] | | 3 | 3 | 3 | 0.25 |
| Evaluation | Dry adhesiveness | | A | D | A | D |
| | Post-storage process adhesiveness | | D | D | D | D |
| | Blocking resistance | | A | A | A | C |
| | Electrolyte solution injectability | | C | B | C | C |
| | Cycle characteristics | | C | B | C | B |

It is understood from Tables 1 to 2 that in Examples 1 to 13, in which compositions for electrochemical device functional layers which contained the particulate polymer, the binder, and the heat-resistant fine particles, wherein the particulate polymer had a volume average particle diameter of 1.0 µm or more and 10.0 µm or less, and had a structure in which the intermediate portion having the lowest glass transition temperature was sandwiched by the inner core portion and the outer shell portions having higher glass transition temperatures than that of the intermediate portion were used, functional layers having excellent post-storage process adhesiveness properties were formed. It can also be seen that in Comparative Examples 1 to 5 which used particulate polymers that did not satisfy the conditions of the present disclosure in terms of structure, and in Comparative Example 6 which used the particulate polymer having a volume average particle diameter of less than 1.0 µm, functional layers having excellent post-storage process adhesiveness were not formed.

INDUSTRIAL APPLICABILITY

According to the present disclosure, it is possible to provide a composition for a functional layer which enables formation of a functional layer having excellent post-storage process adhesiveness.

Further, according to the present disclosure, it is also possible to provide a laminate for an electrochemical device provided with a functional layer that has excellent post-storage process adhesiveness, and an electrochemical device having this laminate for an electrochemical device.

The invention claimed is:

1. A composition for an electrochemical device functional layer comprising a particulate polymer, a binder, and heat-resistant fine particles, wherein the particulate polymer has a volume average particle diameter of 1.0 µm or more and 10.0 µm or less, the particulate polymer comprises an inner core portion and an outer shell portion, and an intermediate portion present between the inner core portion and the outer shell portion, a glass transition temperature $Tg^A$ of the inner core portion and a glass transition temperature $Tg^C$ of the outer shell portion are each independently 30° C. or higher, a glass transition temperature $Tg^B$ of the intermediate portion is 10° C. or higher, and the glass transition temperature $Tg^B$ is the lowest among the glass transition temperatures $Tg^A$, $Tg^B$, and $Tg^C$.

2. The composition for an electrochemical device functional layer according to claim 1, wherein the glass transition temperature $Tg^B$ is 90° C. or lower.

3. The composition for an electrochemical device functional layer according to claim 1, wherein the glass transition temperature $Tg^A$ is higher than the glass transition temperature $Tg^B$ by at least 5° C.

4. A composition for an electrochemical device functional layer according to claim 1, wherein the glass transition temperature $Tg^C$ is 60° C. or higher, and the following relationship is satisfied: (the glass transition temperature $Tg^B$+5° C.)≤the glass transition temperature $Tg^C$≤(the glass transition temperature $Tg^B$+200° C.).

5. The composition for an electrochemical device functional layer according to claim 1, wherein a mass ratio of the inner core portion to the intermediate portion is in a range of 95:5 to 30:70.

6. The composition for an electrochemical device functional layer according to claim 1, wherein a ratio of a total mass of the inner core portion and the intermediate portion to a mass of the outer shell portion is in a range of 99:1 to 50:50.

7. A laminate for an electrochemical device, comprising:

a substrate and an electrochemical device functional layer formed on the substrate, wherein the electrochemical device functional layer is formed using the composition for an electrochemical device functional layer according to claim 1.

8. An electrochemical device comprising the laminate for an electrochemical device according to claim 7.

* * * * *